United States Patent
Murphy et al.

(10) Patent No.: US 8,818,322 B2
(45) Date of Patent: Aug. 26, 2014

(54) UNTETHERED ACCESS POINT MESH SYSTEM AND METHOD

(75) Inventors: James Murphy, Pleasanton, CA (US); Gary Eugene Morain, San Jose, CA (US); Stan Chesnutt, Berkeley, CA (US)

(73) Assignee: Trapeze Networks, Inc., Pleasanton, CA (US)

(*) Notice: Subject to any disclaimer, the term of this patent is extended or adjusted under 35 U.S.C. 154(b) by 884 days.

(21) Appl. No.: 11/801,964

(22) Filed: May 11, 2007

(65) Prior Publication Data
US 2007/0287390 A1 Dec. 13, 2007

Related U.S. Application Data

(60) Provisional application No. 60/812,403, filed on Jun. 9, 2006.

(51) Int. Cl.
*H04M 11/00* (2006.01)
*H04W 12/06* (2009.01)
*H04W 84/22* (2009.01)
*H04W 84/18* (2009.01)
*H04W 88/14* (2009.01)

(52) U.S. Cl.
CPC .............. *H04W 84/22* (2013.01); *H04W 84/18* (2013.01); *H04W 12/06* (2013.01); *H04W 88/14* (2013.01)
USPC ..... 455/403; 455/556.2; 455/567; 455/562.1; 455/90.2; 455/85

(58) Field of Classification Search
CPC ..... H04W 12/06; H04W 84/18; H04W 84/22; H04W 88/14
USPC ................... 455/556.2, 567, 562.1, 90.2, 85; 370/351, 331, 338, 328, 466, 352, 394, 370/465; 709/217
See application file for complete search history.

(56) References Cited

U.S. PATENT DOCUMENTS 3,641,433 A   2/1972   Mifflin et al.
3,906,166 A   9/1975   Cooper et al.
(Continued)

FOREIGN PATENT DOCUMENTS

EP   0 992 921 A2   4/2000
EP   1542 409 A     6/2005
(Continued)

OTHER PUBLICATIONS

U.S. Appl. No. 11/326,966, filed Jan. 2006, Taylor.
(Continued)

*Primary Examiner* — Joseph Arevalo

(57) ABSTRACT

A technique for implementing an untethered access point (UAP) mesh involves enabling AP-local switching at one or more UAPs of the mesh. A system constructed according to the technique may include a wireless switch; an access point (AP) wire-coupled to the wireless switch; and a UAP mesh, wirelessly coupled to the AP, including a UAP with an AP-local switching engine embodied in a computer-readable medium. Another system constructed according to the technique may include an untethered access point (UAP), including: a radio; a backhaul service set identifier (SSID) stored in a computer-readable medium; an anchor access point (AAP) selection engine embodied in a computer-readable medium. In operation, the AAP selection engine may use the radio to attempt to associate with the AAP if a beaconed backhaul SSID matches the stored backhaul SSID. A method according to the technique may include beaconing with a backhaul SSID; acting in concert with an upstream switch as an authenticator for a downstream station that responds to the beacon; providing limited local switching functionality for the downstream station.

17 Claims, 5 Drawing Sheets

(56) References Cited

U.S. PATENT DOCUMENTS

| | | |
|---|---|---|
| 4,168,400 A | 9/1979 | De Couasnon et al. |
| 4,176,316 A | 11/1979 | DeRoas et al. |
| 4,247,908 A | 1/1981 | Lockhart et al. |
| 4,291,401 A | 9/1981 | Bachmann |
| 4,291,409 A | 9/1981 | Weinberg et al. |
| 4,409,470 A | 10/1983 | Shepard et al. |
| 4,460,120 A | 7/1984 | Shepard et al. |
| 4,475,208 A | 10/1984 | Ricketts |
| 4,494,238 A | 1/1985 | Groth, Jr. |
| 4,500,987 A | 2/1985 | Hasegawa |
| 4,503,533 A | 3/1985 | Tobagi et al. |
| 4,550,414 A | 10/1985 | Guinon et al. |
| 4,562,415 A | 12/1985 | McBiles |
| 4,630,264 A | 12/1986 | Wah |
| 4,635,221 A | 1/1987 | Kerr |
| 4,639,914 A | 1/1987 | Winters |
| 4,644,523 A | 2/1987 | Horwitz |
| 4,672,658 A | 6/1987 | Kavehrad |
| 4,673,805 A | 6/1987 | Shepard et al. |
| 4,707,839 A | 11/1987 | Andren et al. |
| 4,730,340 A | 3/1988 | Frazier |
| 4,736,095 A | 4/1988 | Shepard et al. |
| 4,740,792 A | 4/1988 | Sagey et al. |
| 4,758,717 A | 7/1988 | Shepard et al. |
| 4,760,586 A | 7/1988 | Takeda |
| 4,789,983 A | 12/1988 | Acampora et al. |
| 4,829,540 A | 5/1989 | Waggener et al. |
| 4,850,009 A | 7/1989 | Zook et al. |
| 4,872,182 A | 10/1989 | Mcrae et al. |
| 4,894,842 A | 1/1990 | Brockhaven et al. |
| 4,901,307 A | 2/1990 | Gilhousen et al. |
| 4,933,952 A | 6/1990 | Albrieux et al. |
| 4,933,953 A | 6/1990 | Yagi |
| 4,955,053 A | 9/1990 | Siegmund |
| 4,995,053 A | 2/1991 | Simpson et al. |
| 5,008,899 A | 4/1991 | Yamamoto |
| 5,027,343 A | 6/1991 | Chan et al. |
| 5,029,183 A | 7/1991 | Tymes |
| 5,103,459 A | 4/1992 | Gilhousen et al. |
| 5,103,461 A | 4/1992 | Tymes |
| 5,109,390 A | 4/1992 | Gilhousen et al. |
| 5,119,502 A | 6/1992 | Kallin et al. |
| 5,142,550 A | 8/1992 | Tymes |
| 5,151,919 A | 9/1992 | Dent |
| 5,157,687 A | 10/1992 | Tymes |
| 5,187,675 A | 2/1993 | Dent et al. |
| 5,231,633 A | 7/1993 | Hluchyj et al. |
| 5,280,498 A | 1/1994 | Tymes et al. |
| 5,285,494 A | 2/1994 | Sprecher et al. |
| 5,327,144 A | 7/1994 | Stilp et al. |
| 5,329,531 A | 7/1994 | Diepstraten |
| 5,339,316 A | 8/1994 | Diepstraten |
| 5,371,783 A | 12/1994 | Rose et al. |
| 5,418,812 A | 5/1995 | Reyes et al. |
| 5,432,842 A | 7/1995 | Kinoshita |
| 5,444,851 A | 8/1995 | Woest |
| 5,448,569 A | 9/1995 | Huang et al. |
| 5,450,615 A | 9/1995 | Fortune et al. |
| 5,465,401 A | 11/1995 | Thompson |
| 5,479,441 A | 12/1995 | Tymes et al. |
| 5,483,676 A | 1/1996 | Mahany et al. |
| 5,488,569 A | 1/1996 | Kaplan et al. |
| 5,491,644 A | 2/1996 | Pickering et al. |
| 5,517,495 A | 5/1996 | Lund |
| 5,519,762 A | 5/1996 | Bartlett |
| 5,528,621 A | 6/1996 | Heiman et al. |
| 5,542,100 A | 7/1996 | Hatakeyama |
| 5,546,389 A | 8/1996 | Wippenbeck et al. |
| 5,561,841 A | 10/1996 | Markus |
| 5,568,513 A | 10/1996 | Croft et al. |
| 5,570,366 A | 10/1996 | Baker et al. |
| 5,584,048 A | 12/1996 | Wieczorek |
| 5,598,532 A | 1/1997 | Liron |
| 5,630,207 A | 5/1997 | Gitlin et al. |
| 5,640,414 A | 6/1997 | Blakeney et al. |
| 5,649,289 A | 7/1997 | Wang et al. |
| 5,668,803 A | 9/1997 | Tymes et al. |
| 5,670,964 A | 9/1997 | Dent |
| 5,677,954 A | 10/1997 | Hirata et al. |
| 5,706,428 A | 1/1998 | Boer et al. |
| 5,715,304 A | 2/1998 | Nishida et al. |
| 5,729,542 A | 3/1998 | Dupont |
| 5,734,699 A | 3/1998 | Lu et al. |
| 5,742,592 A | 4/1998 | Scholefield et al. |
| 5,774,460 A | 6/1998 | Schiffel et al. |
| 5,793,303 A | 8/1998 | Koga |
| 5,794,128 A | 8/1998 | Brockel et al. |
| 5,812,589 A | 9/1998 | Sealander et al. |
| 5,815,811 A | 9/1998 | Pinard et al. |
| 5,818,385 A | 10/1998 | Bartholomew |
| 5,828,653 A | 10/1998 | Goss |
| 5,828,960 A | 10/1998 | Tang et al. |
| 5,835,061 A | 11/1998 | Stewart |
| 5,838,907 A | 11/1998 | Hansen |
| 5,844,900 A | 12/1998 | Hong et al. |
| 5,852,722 A | 12/1998 | Hamilton |
| 5,862,475 A | 1/1999 | Zicker et al. |
| 5,872,968 A | 2/1999 | Knox et al. |
| 5,875,179 A | 2/1999 | Tikalsky |
| 5,887,259 A | 3/1999 | Zicker et al. |
| 5,896,561 A | 4/1999 | Schrader et al. |
| 5,909,686 A | 6/1999 | Muller et al. |
| 5,915,214 A | 6/1999 | Reece et al. |
| 5,920,821 A | 7/1999 | Seazholtz et al. |
| 5,933,607 A | 8/1999 | Tate et al. |
| 5,938,721 A | 8/1999 | Dussell et al. |
| 5,949,988 A | 9/1999 | Feisullin et al. |
| 5,953,669 A | 9/1999 | Stratis et al. |
| 5,960,335 A | 9/1999 | Umemoto et al. |
| 5,969,678 A | 10/1999 | Stewart |
| 5,970,066 A | 10/1999 | Lowry et al. |
| 5,977,913 A | 11/1999 | Christ |
| 5,980,078 A | 11/1999 | Krivoshein et al. |
| 5,982,779 A | 11/1999 | Krishnakumar et al. |
| 5,987,062 A | 11/1999 | Engwer et al. |
| 5,987,328 A | 11/1999 | Ephremides et al. |
| 5,991,817 A | 11/1999 | Rowett et al. |
| 5,999,813 A | 12/1999 | Lu et al. |
| 6,005,853 A | 12/1999 | Wang et al. |
| 6,011,784 A | 1/2000 | Brown |
| 6,012,088 A | 1/2000 | Li et al. |
| 6,029,196 A | 2/2000 | Lenz |
| 6,041,240 A | 3/2000 | McCarthy et al. |
| 6,041,358 A | 3/2000 | Huang et al. |
| 6,070,243 A | 5/2000 | See et al. |
| 6,073,075 A | 6/2000 | Kondou et al. |
| 6,073,152 A | 6/2000 | De Vries |
| 6,078,568 A | 6/2000 | Wright |
| 6,088,591 A | 7/2000 | Trompower |
| 6,101,539 A | 8/2000 | Kennelly et al. |
| 6,115,390 A | 9/2000 | Chuah |
| 6,118,771 A | 9/2000 | Tajika et al. |
| 6,119,009 A | 9/2000 | Baranger et al. |
| 6,122,520 A | 9/2000 | Want et al. |
| 6,144,638 A | 11/2000 | Obenhuber et al. |
| 6,148,199 A | 11/2000 | Hoffman et al. |
| 6,154,776 A | 11/2000 | Martin |
| 6,160,804 A | 12/2000 | Ahmed et al. |
| 6,177,905 B1 | 1/2001 | Welch |
| 6,188,694 B1 | 2/2001 | Fine et al. |
| 6,199,032 B1 | 3/2001 | Anderson |
| 6,208,629 B1 | 3/2001 | Jaszewki et al. |
| 6,208,841 B1 | 3/2001 | Wallace et al. |
| 6,212,395 B1 | 4/2001 | Lu et al. |
| 6,218,930 B1 | 4/2001 | Katzenberg et al. |
| 6,240,078 B1 | 5/2001 | Kuhnel et al. |
| 6,240,083 B1 | 5/2001 | Wright |
| 6,240,291 B1 | 5/2001 | Narasimhan et al. |
| 6,246,751 B1 | 6/2001 | Bergl et al. |
| 6,249,252 B1 | 6/2001 | Dupray |
| 6,256,300 B1 | 7/2001 | Ahmed et al. |
| 6,256,334 B1 | 7/2001 | Adachi |
| 6,259,405 B1 | 7/2001 | Stewart et al. |
| 6,262,988 B1 | 7/2001 | Vig |

(56) References Cited

U.S. PATENT DOCUMENTS

| | | | |
|---|---|---|---|
| 6,269,246 | B1 | 7/2001 | Rao et al. |
| 6,285,662 | B1 | 9/2001 | Watannabe |
| 6,304,596 | B1 | 10/2001 | Yamano et al. |
| 6,304,906 | B1 | 10/2001 | Bhatti et al. |
| 6,317,599 | B1 | 11/2001 | Rappaport et al. |
| 6,326,918 | B1 | 12/2001 | Stewart |
| 6,336,035 | B1 | 1/2002 | Somoza et al. |
| 6,336,152 | B1 | 1/2002 | Richman et al. |
| 6,347,091 | B1 | 2/2002 | Wallentin et al. |
| 6,356,758 | B1 | 3/2002 | Almeida et al. |
| 6,393,290 | B1 | 5/2002 | Ulfongene |
| 6,397,040 | B1 | 5/2002 | Titmuss et al. |
| 6,400,722 | B1 | 6/2002 | Chuah et al. |
| 6,404,772 | B1 | 6/2002 | Beach et al. |
| 6,421,714 | B1 | 7/2002 | Rai et al. |
| 6,429,879 | B1 | 8/2002 | Sturgeon et al. |
| 6,446,206 | B1 | 9/2002 | Feldbaum |
| 6,456,239 | B1 | 9/2002 | Werb et al. |
| 6,470,025 | B1 | 10/2002 | Wilson et al. |
| 6,473,449 | B1 | 10/2002 | Cafarella et al. |
| 6,493,679 | B1 | 12/2002 | Rappaport et al. |
| 6,496,290 | B1 | 12/2002 | Lee |
| 6,512,916 | B1 | 1/2003 | Forbes, Jr. |
| 6,526,275 | B1 | 2/2003 | Calvert |
| 6,535,732 | B1 | 3/2003 | McIntosh et al. |
| 6,564,380 | B1 | 5/2003 | Murphy |
| 6,567,146 | B2 | 5/2003 | Hirakata et al. |
| 6,567,416 | B1 | 5/2003 | Chuah |
| 6,574,240 | B1 | 6/2003 | Tzeng |
| 6,580,700 | B1 | 6/2003 | Pinard et al. |
| 6,584,494 | B1 | 6/2003 | Manabe et al. |
| 6,587,680 | B1 | 7/2003 | Ata-Laurila et al. |
| 6,587,835 | B1 | 7/2003 | Treyz et al. |
| 6,603,970 | B1 | 8/2003 | Huelamo Platas et al. |
| 6,614,787 | B1 | 9/2003 | Jain et al. |
| 6,615,276 | B1 | 9/2003 | Mastrianni et al. |
| 6,624,762 | B1 | 9/2003 | End, III |
| 6,625,454 | B1 | 9/2003 | Rappaport et al. |
| 6,631,267 | B1 | 10/2003 | Clarkson et al. |
| 6,650,912 | B2 | 11/2003 | Chen et al. |
| 6,658,389 | B1 | 12/2003 | Alpdemir |
| 6,659,947 | B1 | 12/2003 | Carter et al. |
| 6,661,787 | B1 | 12/2003 | O'Connell et al. |
| 6,674,403 | B2 | 1/2004 | Gray et al. |
| 6,677,894 | B2 | 1/2004 | Sheynblat et al. |
| 6,678,516 | B2 | 1/2004 | Nordman et al. |
| 6,678,802 | B2 | 1/2004 | Hickson |
| 6,687,498 | B2 | 2/2004 | McKenna et al. |
| 6,697,415 | B1 | 2/2004 | Mahany |
| 6,721,334 | B1 | 4/2004 | Ketcham |
| 6,721,548 | B1 | 4/2004 | Mohindra et al. |
| 6,725,260 | B1 | 4/2004 | Philyaw |
| 6,738,629 | B1 | 5/2004 | McCormick et al. |
| 6,747,961 | B1 | 6/2004 | Ahmed et al. |
| 6,756,940 | B2 | 6/2004 | Oh et al. |
| 6,760,324 | B1 | 7/2004 | Scott et al. |
| 6,785,275 | B1 | 8/2004 | Boivie et al. |
| 6,788,938 | B1 | 9/2004 | Sugaya et al. |
| 6,798,788 | B1 | 9/2004 | Viswanath et al. |
| 6,801,782 | B2 | 10/2004 | McCrady et al. |
| 6,826,399 | B1 | 11/2004 | Hoffman et al. |
| 6,839,338 | B1 | 1/2005 | Amara et al. |
| 6,839,348 | B2 | 1/2005 | Tang et al. |
| 6,839,388 | B2 | 1/2005 | Vaidyanathan |
| 6,847,620 | B1 | 1/2005 | Meier |
| 6,847,892 | B2 | 1/2005 | Zhou et al. |
| 6,856,800 | B1 | 2/2005 | Henry et al. |
| 6,865,609 | B1 | 3/2005 | Gubbi et al. |
| 6,879,812 | B2 | 4/2005 | Agrawal et al. |
| 6,901,439 | B1 | 5/2005 | Bonasia et al. |
| 6,917,688 | B2 | 7/2005 | Yu et al. |
| 6,934,260 | B1 | 8/2005 | Kanuri |
| 6,937,566 | B1 | 8/2005 | Forslow |
| 6,938,079 | B1 | 8/2005 | Anderson et al. |
| 6,957,067 | B1 | 10/2005 | Iyer et al. |
| 6,973,622 | B1 | 12/2005 | Rappaport et al. |
| 6,978,301 | B2 | 12/2005 | Tindal |
| 6,980,533 | B1 | 12/2005 | Abraham et al. |
| 6,985,469 | B2 | 1/2006 | Leung |
| 6,985,697 | B2 | 1/2006 | Smith et al. |
| 6,990,348 | B1 | 1/2006 | Benveniste |
| 6,993,683 | B1 | 1/2006 | Bhat et al. |
| 6,996,630 | B1 | 2/2006 | Masaki et al. |
| 7,013,157 | B1 | 3/2006 | Norman et al. |
| 7,020,438 | B2 | 3/2006 | Sinivaara et al. |
| 7,020,773 | B1 | 3/2006 | Otway et al. |
| 7,024,199 | B1 | 4/2006 | Massie et al. |
| 7,024,394 | B1 | 4/2006 | Ashour et al. |
| 7,027,773 | B1 | 4/2006 | McMillin |
| 7,031,705 | B2 | 4/2006 | Grootwassink |
| 7,035,220 | B1 | 4/2006 | Simcoe |
| 7,039,037 | B2 | 5/2006 | Wang et al. |
| 7,058,414 | B1 | 6/2006 | Rofheart et al. |
| 7,062,566 | B2 | 6/2006 | Amara et al. |
| 7,068,999 | B2 | 6/2006 | Ballai |
| 7,079,537 | B1 | 7/2006 | Kanuri et al. |
| 7,089,322 | B1 | 8/2006 | Stallmann |
| 7,092,529 | B2 | 8/2006 | Yu et al. |
| 7,110,756 | B2 | 9/2006 | Diener |
| 7,116,979 | B2 | 10/2006 | Backes et al. |
| 7,126,913 | B1 | 10/2006 | Patel et al. |
| 7,134,012 | B2 | 11/2006 | Doyle et al. |
| 7,139,829 | B2 | 11/2006 | Wenzel et al. |
| 7,142,867 | B1 | 11/2006 | Gandhi et al. |
| 7,146,166 | B2 | 12/2006 | Backes et al. |
| 7,155,236 | B2 | 12/2006 | Chen et al. |
| 7,155,518 | B2 | 12/2006 | Forslow |
| 7,158,777 | B2 | 1/2007 | Lee et al. |
| 7,159,016 | B2 | 1/2007 | Baker |
| 7,221,927 | B2 | 5/2007 | Kolar et al. |
| 7,224,970 | B2 | 5/2007 | Smith et al. |
| 7,239,862 | B1 | 7/2007 | Clare et al. |
| 7,246,243 | B2 | 7/2007 | Uchida |
| 7,263,366 | B2 | 8/2007 | Miyashita |
| 7,274,730 | B2 | 9/2007 | Nakabayashi |
| 7,280,495 | B1 | 10/2007 | Zweig et al. |
| 7,290,051 | B2 | 10/2007 | Dobric et al. |
| 7,293,136 | B1 | 11/2007 | More et al. |
| 7,310,664 | B1 | 12/2007 | Merchant et al. |
| 7,317,914 | B2 | 1/2008 | Adya et al. |
| 7,320,070 | B2 | 1/2008 | Baum |
| 7,324,468 | B2 | 1/2008 | Fischer |
| 7,324,487 | B2 | 1/2008 | Saito |
| 7,324,489 | B1 | 1/2008 | Iyer et al. |
| 7,336,961 | B1 | 2/2008 | Ngan |
| 7,349,412 | B1 | 3/2008 | Jones et al. |
| 7,350,077 | B2 | 3/2008 | Meier et al. |
| 7,359,676 | B2 | 4/2008 | Hrastar |
| 7,370,362 | B2 | 5/2008 | Olson et al. |
| 7,376,080 | B1 | 5/2008 | Riddle et al. |
| 7,379,423 | B1 | 5/2008 | Caves et al. |
| 7,382,756 | B2 | 6/2008 | Barber et al. |
| 7,417,953 | B2 | 8/2008 | Hicks et al. |
| 7,421,248 | B1 | 9/2008 | Laux et al. |
| 7,421,487 | B1 | 9/2008 | Peterson et al. |
| 7,440,416 | B2 | 10/2008 | Mahany et al. |
| 7,443,823 | B2 | 10/2008 | Hunkeler et al. |
| 7,447,502 | B2 | 11/2008 | Buckley |
| 7,451,316 | B2 | 11/2008 | Halasz et al. |
| 7,460,855 | B2 | 12/2008 | Barkley et al. |
| 7,466,678 | B2 | 12/2008 | Cromer et al. |
| 7,475,130 | B2 | 1/2009 | Silverman |
| 7,477,894 | B1 | 1/2009 | Sinha |
| 7,480,264 | B1 | 1/2009 | Duo et al. |
| 7,483,390 | B2 | 1/2009 | Rover et al. |
| 7,489,648 | B2 | 2/2009 | Griswold |
| 7,493,407 | B2 | 2/2009 | Leedom et al. |
| 7,505,434 | B1 | 3/2009 | Backes |
| 7,509,096 | B2 | 3/2009 | Palm et al. |
| 7,519,372 | B2 | 4/2009 | MacDonald et al. |
| 7,529,925 | B2 | 5/2009 | Harkins |
| 7,551,574 | B1 | 6/2009 | Peden, II et al. |
| 7,551,619 | B2 | 6/2009 | Tiwari |
| 7,558,266 | B2 | 7/2009 | Hu |

(56) References Cited

U.S. PATENT DOCUMENTS

| | | |
|---|---|---|
| 7,570,656 B2 | 8/2009 | Raphaeli et al. |
| 7,573,859 B2 | 8/2009 | Taylor |
| 7,577,453 B2 | 8/2009 | Matta |
| 7,592,906 B1 | 9/2009 | Hanna et al. |
| 7,603,119 B1 | 10/2009 | Durig et al. |
| 7,603,710 B2 | 10/2009 | Harvey et al. |
| 7,636,363 B2 | 12/2009 | Chang et al. |
| 7,665,132 B2 | 2/2010 | Hisada et al. |
| 7,680,501 B2 | 3/2010 | Sillasto et al. |
| 7,693,526 B2 | 4/2010 | Qian et al. |
| 7,706,749 B2 | 4/2010 | Ritala |
| 7,715,432 B2 * | 5/2010 | Bennett .................. 370/466 |
| 7,716,379 B2 | 5/2010 | Ruan et al. |
| 7,724,703 B2 | 5/2010 | Matta et al. |
| 7,724,704 B2 | 5/2010 | Simons et al. |
| 7,729,278 B2 | 6/2010 | Chari et al. |
| 7,733,868 B2 | 6/2010 | Van Zijst |
| 7,738,433 B2 | 6/2010 | Tao |
| 7,746,897 B2 | 6/2010 | Stephenson et al. |
| 7,788,475 B2 | 8/2010 | Zimmer et al. |
| 7,805,529 B2 | 9/2010 | Galluzzo et al. |
| 7,817,554 B2 | 10/2010 | Skog et al. |
| 7,844,298 B2 | 11/2010 | Riley |
| 7,856,659 B2 | 12/2010 | Keeler et al. |
| 7,865,713 B2 | 1/2011 | Chesnutt et al. |
| 7,873,061 B2 | 1/2011 | Gast et al. |
| 7,894,852 B2 | 2/2011 | Hansen |
| 7,912,982 B2 | 3/2011 | Murphy |
| 7,920,548 B2 | 4/2011 | Lor et al. |
| 7,929,922 B2 | 4/2011 | Kubo |
| 7,945,399 B2 | 5/2011 | Nosovitsky et al. |
| 7,986,940 B2 | 7/2011 | Lee et al. |
| 8,000,724 B1 | 8/2011 | Rayburn et al. |
| 8,014,404 B2 | 9/2011 | Eki et al. |
| 8,019,082 B1 | 9/2011 | Wiedmann et al. |
| 8,019,352 B2 | 9/2011 | Rappaport et al. |
| 8,116,275 B2 | 2/2012 | Matta et al. |
| 8,140,845 B2 | 3/2012 | Buddhikot et al. |
| 8,150,357 B2 | 4/2012 | Aragon |
| 8,161,278 B2 | 4/2012 | Harkins |
| 8,190,750 B2 | 5/2012 | Balachandran et al. |
| 8,238,942 B2 | 8/2012 | Gast |
| 8,270,384 B2 | 9/2012 | Cheng et al. |
| 2001/0007567 A1 | 7/2001 | Ando et al. |
| 2001/0024953 A1 | 9/2001 | Balogh |
| 2002/0021701 A1 | 2/2002 | Lavian et al. |
| 2002/0052205 A1 | 5/2002 | Belostofsky et al. |
| 2002/0060995 A1 | 5/2002 | Cervello et al. |
| 2002/0062384 A1 | 5/2002 | Tso |
| 2002/0069278 A1 | 6/2002 | Forslow |
| 2002/0078361 A1 | 6/2002 | Giroux et al. |
| 2002/0080790 A1 | 6/2002 | Beshai |
| 2002/0082913 A1 | 6/2002 | Li |
| 2002/0087699 A1 | 7/2002 | Karagiannis et al. |
| 2002/0094824 A1 | 7/2002 | Kennedy et al. |
| 2002/0095486 A1 | 7/2002 | Bahl |
| 2002/0101868 A1 | 8/2002 | Clear et al. |
| 2002/0116655 A1 | 8/2002 | Lew et al. |
| 2002/0157020 A1 | 10/2002 | Royer |
| 2002/0174137 A1 | 11/2002 | Wolff et al. |
| 2002/0176437 A1 | 11/2002 | Busch et al. |
| 2002/0188756 A1 | 12/2002 | Weil et al. |
| 2002/0191572 A1 | 12/2002 | Weinstein et al. |
| 2002/0194251 A1 | 12/2002 | Richter et al. |
| 2003/0014646 A1 | 1/2003 | Buddhikot et al. |
| 2003/0018889 A1 | 1/2003 | Burnett et al. |
| 2003/0043073 A1 | 3/2003 | Gray et al. |
| 2003/0055959 A1 | 3/2003 | Sato |
| 2003/0107590 A1 | 6/2003 | Levillain et al. |
| 2003/0120764 A1 | 6/2003 | Laye et al. |
| 2003/0133450 A1 | 7/2003 | Baum |
| 2003/0134642 A1 | 7/2003 | Kostic et al. |
| 2003/0135762 A1 | 7/2003 | Macaulay |
| 2003/0156586 A1 | 8/2003 | Lee et al. |
| 2003/0174706 A1 | 9/2003 | Shankar et al. |
| 2003/0193910 A1 | 10/2003 | Shoaib et al. |
| 2003/0204596 A1 | 10/2003 | Yadav |
| 2003/0227934 A1 | 12/2003 | White et al. |
| 2004/0002343 A1 | 1/2004 | Brauel et al. |
| 2004/0003285 A1 | 1/2004 | Whelan et al. |
| 2004/0008652 A1 | 1/2004 | Tanzella et al. |
| 2004/0019857 A1 | 1/2004 | Teig et al. |
| 2004/0025044 A1 | 2/2004 | Day |
| 2004/0029580 A1 | 2/2004 | Haverinen et al. |
| 2004/0030777 A1 | 2/2004 | Reedy et al. |
| 2004/0030931 A1 | 2/2004 | Chamandy et al. |
| 2004/0038687 A1 | 2/2004 | Nelson |
| 2004/0044749 A1 | 3/2004 | Harkin |
| 2004/0047320 A1 | 3/2004 | Eglin |
| 2004/0049699 A1 | 3/2004 | Griffith et al. |
| 2004/0053632 A1 | 3/2004 | Nikkelen et al. |
| 2004/0054569 A1 | 3/2004 | Pombo et al. |
| 2004/0054774 A1 | 3/2004 | Barber et al. |
| 2004/0054926 A1 | 3/2004 | Ocepek et al. |
| 2004/0062267 A1 | 4/2004 | Minami et al. |
| 2004/0064560 A1 | 4/2004 | Zhang et al. |
| 2004/0064591 A1 | 4/2004 | Noble |
| 2004/0068668 A1 | 4/2004 | Lor et al. |
| 2004/0078598 A1 | 4/2004 | Barber et al. |
| 2004/0093506 A1 | 5/2004 | Grawrock et al. |
| 2004/0095914 A1 | 5/2004 | Katsube et al. |
| 2004/0095932 A1 | 5/2004 | Astarabadi et al. |
| 2004/0106403 A1 | 6/2004 | Mori et al. |
| 2004/0111640 A1 | 6/2004 | Baum |
| 2004/0114546 A1 | 6/2004 | Seshadri et al. |
| 2004/0119641 A1 | 6/2004 | Rapeli |
| 2004/0120370 A1 | 6/2004 | Lupo |
| 2004/0132438 A1 | 7/2004 | White |
| 2004/0143428 A1 | 7/2004 | Rappaport et al. |
| 2004/0143755 A1 | 7/2004 | Whitaker et al. |
| 2004/0165545 A1 | 8/2004 | Cook |
| 2004/0174900 A1 | 9/2004 | Volpi et al. |
| 2004/0184475 A1 | 9/2004 | Meier |
| 2004/0208570 A1 | 10/2004 | Reader |
| 2004/0214572 A1 | 10/2004 | Thompson et al. |
| 2004/0221042 A1 | 11/2004 | Meier |
| 2004/0230370 A1 | 11/2004 | Tzamaloukas |
| 2004/0233234 A1 | 11/2004 | Chaudhry et al. |
| 2004/0236702 A1 | 11/2004 | Fink et al. |
| 2004/0246937 A1 | 12/2004 | Duong et al. |
| 2004/0246962 A1 | 12/2004 | Kopeikin et al. |
| 2004/0252656 A1 | 12/2004 | Shiu et al. |
| 2004/0255167 A1 | 12/2004 | Knight |
| 2004/0259542 A1 | 12/2004 | Viitamaki et al. |
| 2004/0259552 A1 | 12/2004 | Ihori et al. |
| 2004/0259554 A1 | 12/2004 | Rappaport et al. |
| 2004/0259555 A1 | 12/2004 | Rappaport et al. |
| 2004/0259575 A1 | 12/2004 | Perez-Breva et al. |
| 2005/0015592 A1 | 1/2005 | Lin |
| 2005/0021979 A1 | 1/2005 | Wiedmann et al. |
| 2005/0025103 A1 | 2/2005 | Ko et al. |
| 2005/0025105 A1 | 2/2005 | Rue |
| 2005/0026611 A1 | 2/2005 | Backes |
| 2005/0030894 A1 | 2/2005 | Stephens |
| 2005/0030929 A1 | 2/2005 | Swier et al. |
| 2005/0037733 A1 | 2/2005 | Coleman et al. |
| 2005/0037818 A1 | 2/2005 | Seshadri et al. |
| 2005/0040968 A1 | 2/2005 | Damarla et al. |
| 2005/0054326 A1 | 3/2005 | Rogers |
| 2005/0054350 A1 | 3/2005 | Zegelin |
| 2005/0058132 A1 | 3/2005 | Okano et al. |
| 2005/0059405 A1 | 3/2005 | Thomson et al. |
| 2005/0059406 A1 | 3/2005 | Thomson et al. |
| 2005/0064873 A1 | 3/2005 | Karaoguz et al. |
| 2005/0068925 A1 | 3/2005 | Palm et al. |
| 2005/0073980 A1 | 4/2005 | Thomson et al. |
| 2005/0078644 A1 | 4/2005 | Tsai et al. |
| 2005/0097618 A1 | 5/2005 | Arling et al. |
| 2005/0114649 A1 | 5/2005 | Challener et al. |
| 2005/0120125 A1 * | 6/2005 | Morten et al. ................. 709/231 |
| 2005/0122927 A1 | 6/2005 | Wentink |
| 2005/0122977 A1 | 6/2005 | Lieberman |
| 2005/0128142 A1 | 6/2005 | Shin et al. |
| 2005/0128989 A1 | 6/2005 | Bhagwat et al. |

(56) References Cited

U.S. PATENT DOCUMENTS

| | | |
|---|---|---|
| 2005/0144237 A1 | 6/2005 | Heredia et al. |
| 2005/0147032 A1 | 7/2005 | Lyon et al. |
| 2005/0154933 A1 | 7/2005 | Hsu et al. |
| 2005/0157730 A1 | 7/2005 | Grant et al. |
| 2005/0159154 A1 | 7/2005 | Goren |
| 2005/0163078 A1 | 7/2005 | Oba et al. |
| 2005/0163146 A1 | 7/2005 | Ota et al. |
| 2005/0166072 A1 | 7/2005 | Converse et al. |
| 2005/0175027 A1 | 8/2005 | Miller et al. |
| 2005/0180345 A1 | 8/2005 | Meier |
| 2005/0180358 A1 | 8/2005 | Kolar et al. |
| 2005/0181805 A1 | 8/2005 | Gallagher |
| 2005/0190714 A1 | 9/2005 | Gorbatov et al. |
| 2005/0193103 A1 | 9/2005 | Drabik |
| 2005/0207336 A1 | 9/2005 | Choi et al. |
| 2005/0213519 A1 | 9/2005 | Relan et al. |
| 2005/0220033 A1 | 10/2005 | DelRegno et al. |
| 2005/0223111 A1 | 10/2005 | Bhandaru et al. |
| 2005/0239461 A1 | 10/2005 | Verma et al. |
| 2005/0240665 A1 | 10/2005 | Gu et al. |
| 2005/0243737 A1 | 11/2005 | Dooley et al. |
| 2005/0245258 A1 | 11/2005 | Classon et al. |
| 2005/0245269 A1 | 11/2005 | Demirhan et al. |
| 2005/0259597 A1 | 11/2005 | Benedetotto et al. |
| 2005/0259611 A1 | 11/2005 | Bhagwat et al. |
| 2005/0265321 A1 | 12/2005 | Rappaport et al. |
| 2005/0268335 A1 | 12/2005 | Le et al. |
| 2005/0270992 A1 | 12/2005 | Sanzgiri et al. |
| 2005/0273442 A1 | 12/2005 | Bennett |
| 2005/0276218 A1 | 12/2005 | Ooghe et al. |
| 2005/0286466 A1 | 12/2005 | Tagg et al. |
| 2006/0030290 A1 | 2/2006 | Rudolf et al. |
| 2006/0035662 A1 | 2/2006 | Jeong et al. |
| 2006/0039395 A1 | 2/2006 | Perez-Costa et al. |
| 2006/0041683 A1 | 2/2006 | Subramanian et al. |
| 2006/0045050 A1 | 3/2006 | Floros et al. |
| 2006/0046744 A1 | 3/2006 | Dublish et al. |
| 2006/0050742 A1 | 3/2006 | Grandhi et al. |
| 2006/0073847 A1* | 4/2006 | Pirzada et al. .............. 455/556.2 |
| 2006/0094440 A1* | 5/2006 | Meier et al. ...................... 705/57 |
| 2006/0098607 A1 | 5/2006 | Zeng et al. |
| 2006/0104224 A1 | 5/2006 | Singh et al. |
| 2006/0114872 A1 | 6/2006 | Hamada |
| 2006/0114938 A1 | 6/2006 | Kalkunte et al. |
| 2006/0117174 A1 | 6/2006 | Lee |
| 2006/0128415 A1 | 6/2006 | Horikoshi et al. |
| 2006/0143496 A1 | 6/2006 | Silverman |
| 2006/0143702 A1 | 6/2006 | Hisada et al. |
| 2006/0152344 A1* | 7/2006 | Mowery, Jr. .............. 340/310.11 |
| 2006/0153122 A1 | 7/2006 | Hinman et al. |
| 2006/0160540 A1 | 7/2006 | Strutt et al. |
| 2006/0161983 A1 | 7/2006 | Cothrell et al. |
| 2006/0165103 A1 | 7/2006 | Trudeau et al. |
| 2006/0168383 A1 | 7/2006 | Lin |
| 2006/0173844 A1 | 8/2006 | Zhang et al. |
| 2006/0174336 A1 | 8/2006 | Chen |
| 2006/0178168 A1* | 8/2006 | Roach .......................... 455/567 |
| 2006/0182118 A1 | 8/2006 | Lam et al. |
| 2006/0187878 A1 | 8/2006 | Calhoun et al. |
| 2006/0189311 A1 | 8/2006 | Cromer et al. |
| 2006/0190721 A1 | 8/2006 | Kawakami et al. |
| 2006/0193258 A1 | 8/2006 | Ballai |
| 2006/0200862 A1 | 9/2006 | Olson et al. |
| 2006/0206582 A1* | 9/2006 | Finn .............................. 709/217 |
| 2006/0215601 A1 | 9/2006 | Vieugels et al. |
| 2006/0217131 A1 | 9/2006 | Alizadeh-Shabdiz et al. |
| 2006/0245393 A1 | 11/2006 | Bajic |
| 2006/0248229 A1 | 11/2006 | Saunderson et al. |
| 2006/0248331 A1 | 11/2006 | Harkins |
| 2006/0268696 A1 | 11/2006 | Konstantinov et al. |
| 2006/0274774 A1 | 12/2006 | Srinivasan et al. |
| 2006/0276192 A1 | 12/2006 | Dutta et al. |
| 2006/0285489 A1 | 12/2006 | Francisco et al. |
| 2006/0292992 A1 | 12/2006 | Tajima et al. |
| 2007/0002833 A1 | 1/2007 | Bajic |
| 2007/0010248 A1 | 1/2007 | Dravida et al. |
| 2007/0011318 A1 | 1/2007 | Roth |
| 2007/0025265 A1 | 2/2007 | Porras et al. |
| 2007/0025306 A1 | 2/2007 | Cox et al. |
| 2007/0027964 A1 | 2/2007 | Herrod et al. |
| 2007/0054616 A1 | 3/2007 | Culbert |
| 2007/0058598 A1 | 3/2007 | Ling |
| 2007/0064673 A1* | 3/2007 | Bhandaru et al. ............. 370/351 |
| 2007/0064718 A1 | 3/2007 | Ekl et al. |
| 2007/0067823 A1 | 3/2007 | Shim et al. |
| 2007/0070937 A1 | 3/2007 | Demirhan et al. |
| 2007/0076694 A1 | 4/2007 | Iyer et al. |
| 2007/0081477 A1 | 4/2007 | Jakkahalli et al. |
| 2007/0082677 A1 | 4/2007 | Hart et al. |
| 2007/0083924 A1 | 4/2007 | Lu |
| 2007/0086378 A1 | 4/2007 | Matta et al. |
| 2007/0086397 A1 | 4/2007 | Taylor |
| 2007/0086398 A1 | 4/2007 | Tiwari |
| 2007/0091845 A1* | 4/2007 | Brideglall ...................... 370/331 |
| 2007/0091889 A1 | 4/2007 | Xiao et al. |
| 2007/0098086 A1 | 5/2007 | Bhaskaran |
| 2007/0104197 A1 | 5/2007 | King |
| 2007/0106776 A1 | 5/2007 | Konno et al. |
| 2007/0109991 A1 | 5/2007 | Bennett |
| 2007/0110035 A1 | 5/2007 | Bennett |
| 2007/0115842 A1 | 5/2007 | Matsuda et al. |
| 2007/0133494 A1 | 6/2007 | Lai et al. |
| 2007/0135159 A1 | 6/2007 | Sinivaara |
| 2007/0135866 A1 | 6/2007 | Baker et al. |
| 2007/0136372 A1 | 6/2007 | Proctor et al. |
| 2007/0140163 A1 | 6/2007 | Meier et al. |
| 2007/0143851 A1 | 6/2007 | Nicodemus et al. |
| 2007/0147318 A1 | 6/2007 | Ross et al. |
| 2007/0150945 A1 | 6/2007 | Whitaker et al. |
| 2007/0160046 A1 | 7/2007 | Matta |
| 2007/0171909 A1 | 7/2007 | Pignatelli |
| 2007/0183375 A1 | 8/2007 | Tiwari |
| 2007/0183402 A1 | 8/2007 | Bennett |
| 2007/0189222 A1 | 8/2007 | Kolar et al. |
| 2007/0195793 A1 | 8/2007 | Grosser et al. |
| 2007/0206527 A1 | 9/2007 | Lo et al. |
| 2007/0230457 A1 | 10/2007 | Kodera et al. |
| 2007/0248009 A1 | 10/2007 | Petersen |
| 2007/0253380 A1* | 11/2007 | Jollota et al. ................... 370/338 |
| 2007/0255116 A1* | 11/2007 | Mehta et al. ................... 600/300 |
| 2007/0258448 A1 | 11/2007 | Hu |
| 2007/0260720 A1 | 11/2007 | Morain |
| 2007/0268506 A1 | 11/2007 | Zeldin |
| 2007/0268514 A1 | 11/2007 | Zeldin et al. |
| 2007/0268515 A1 | 11/2007 | Freund et al. |
| 2007/0268516 A1 | 11/2007 | Bugwadia et al. |
| 2007/0286208 A1 | 12/2007 | Kanada et al. |
| 2007/0291689 A1* | 12/2007 | Kapur et al. ................... 370/328 |
| 2007/0297329 A1 | 12/2007 | Park et al. |
| 2008/0002588 A1 | 1/2008 | McCaughan et al. |
| 2008/0008117 A1 | 1/2008 | Alizadeh-Shabdiz |
| 2008/0013481 A1 | 1/2008 | Simons et al. |
| 2008/0014916 A1 | 1/2008 | Chen |
| 2008/0031257 A1 | 2/2008 | He |
| 2008/0039114 A1 | 2/2008 | Phatak et al. |
| 2008/0056200 A1 | 3/2008 | Johnson |
| 2008/0056211 A1 | 3/2008 | Kim et al. |
| 2008/0064356 A1 | 3/2008 | Khayrallah |
| 2008/0069018 A1 | 3/2008 | Gast |
| 2008/0080441 A1 | 4/2008 | Park et al. |
| 2008/0102815 A1 | 5/2008 | Sengupta et al. |
| 2008/0107077 A1 | 5/2008 | Murphy |
| 2008/0114784 A1 | 5/2008 | Murphy |
| 2008/0117822 A1 | 5/2008 | Murphy et al. |
| 2008/0130523 A1 | 6/2008 | Fridman et al. |
| 2008/0151844 A1* | 6/2008 | Tiwari ........................... 370/338 |
| 2008/0159319 A1 | 7/2008 | Gast et al. |
| 2008/0162921 A1 | 7/2008 | Chesnutt et al. |
| 2008/0220772 A1 | 9/2008 | Islam et al. |
| 2008/0226075 A1 | 9/2008 | Gast |
| 2008/0228942 A1 | 9/2008 | Lor et al. |
| 2008/0250496 A1 | 10/2008 | Namihira |
| 2008/0261615 A1 | 10/2008 | Kalhan |
| 2008/0276303 A1 | 11/2008 | Gast |

(56) References Cited

U.S. PATENT DOCUMENTS

| | | | |
|---|---|---|---|
| 2009/0010206 A1 | 1/2009 | Giaretta et al. | |
| 2009/0028118 A1 | 1/2009 | Gray et al. | |
| 2009/0031044 A1 | 1/2009 | Barrack et al. | |
| 2009/0046688 A1* | 2/2009 | Volpi et al. | 370/338 |
| 2009/0059930 A1 | 3/2009 | Ryan et al. | |
| 2009/0067436 A1 | 3/2009 | Gast | |
| 2009/0073905 A1 | 3/2009 | Gast | |
| 2009/0131082 A1 | 5/2009 | Gast | |
| 2009/0198999 A1 | 8/2009 | Harkins | |
| 2009/0247103 A1 | 10/2009 | Aragon | |
| 2009/0252120 A1 | 10/2009 | Kim et al. | |
| 2009/0257437 A1 | 10/2009 | Tiwari | |
| 2009/0260083 A1 | 10/2009 | Szeto et al. | |
| 2009/0274060 A1 | 11/2009 | Taylor | |
| 2009/0287816 A1 | 11/2009 | Matta et al. | |
| 2009/0293106 A1 | 11/2009 | Peden, II et al. | |
| 2010/0002610 A1 | 1/2010 | Bowser et al. | |
| 2010/0024007 A1 | 1/2010 | Gast | |
| 2010/0040059 A1 | 2/2010 | Hu | |
| 2010/0067379 A1 | 3/2010 | Zhao et al. | |
| 2010/0113098 A1* | 5/2010 | Riley | 455/562.1 |
| 2010/0142478 A1 | 6/2010 | Forssell et al. | |
| 2010/0159827 A1 | 6/2010 | Rhodes et al. | |
| 2010/0172276 A1 | 7/2010 | Aragon | |
| 2010/0180016 A1 | 7/2010 | Bugwadia et al. | |
| 2010/0195549 A1 | 8/2010 | Aragon et al. | |
| 2010/0261475 A1 | 10/2010 | Kim et al. | |
| 2010/0271188 A1 | 10/2010 | Nysen | |
| 2010/0329177 A1 | 12/2010 | Murphy et al. | |
| 2011/0128858 A1 | 6/2011 | Matta et al. | |
| 2011/0158122 A1 | 6/2011 | Murphy et al. | |
| 2012/0190320 A1 | 7/2012 | Aragon | |
| 2012/0190323 A1 | 7/2012 | Aragon | |
| 2012/0204031 A1 | 8/2012 | Harkins | |

FOREIGN PATENT DOCUMENTS

| | | |
|---|---|---|
| GB | 2 329 801 A | 3/1999 |
| GB | 2429080 A | 2/2007 |
| JP | 2000-215169 A1 | 8/2000 |
| JP | 2003-234751 A1 | 8/2003 |
| JP | 2003274454 | 9/2003 |
| JP | 2004-032525 A1 | 1/2004 |
| WO | WO94/03986 | 2/1994 |
| WO | WO99/11003 | 3/1999 |
| WO | WO 00/06271 A1 | 2/2000 |
| WO | WO 00/18148 | 3/2000 |
| WO | WO 02/089442 A1 | 11/2002 |
| WO | WO 03/085544 A1 | 10/2003 |
| WO | WO 2004/013986 A1 | 2/2004 |
| WO | WO 2004/095192 A2 | 11/2004 |
| WO | WO 2004/095800 A1 | 11/2004 |
| WO | WO 2006/014512 A2 | 2/2006 |
| WO | WO 2010/130133 A1 | 11/2010 |

OTHER PUBLICATIONS

U.S. Appl. No. 11/330,877, filed Jan. 2006, Matta.
U.S. Appl. No. 11/331,789, filed Jan. 2006, Matta. et al.
U.S. Appl. No. 11/351,104, filed Feb. 2006, Tiwari.
U.S. Appl. No. 11/377,859, filed Mar. 2006, Harkins.
U.S. Appl. No. 11/400,165, filed Apr. 2006, Tiwari.
U.S. Appl. No. 11/445,750, filed May 2006, Matta.
U.S. Appl. No. 11/417,830, filed May 2006, Morain.
U.S. Appl. No. 11/417,993, filed May 2006, Jar et al.
U.S. Appl. No. 11/437,537, filed May 2006, Freund et al.
U.S. Appl. No. 11/437,538, filed May 2006, Zeldin.
U.S. Appl. No. 11/437,387, filed May 2006, Zeldin et al.
U.S. Appl. No. 11/437,582, filed May 2006, Buawadia et al.
U.S. Appl. No. 11/451,704, filed Jun. 2006, Riley.
Acampora and Winters, IEEE Communications Magazine, 25(8):11-20 (1987).
Acampora and Winters, IEEE Journal on selected Areas in Communications. SAC-5:796-804 (1987).
Bing and Subramanian, IEEE, 1318-1322 (1997).
Durgin, et al., "Measurements and Models for Radio Path Loss and Penetration Loss in and Around Homes and Trees at 5.85 GHz", IEEE Transactions on Communications, vol. 46, No. 11, Nov. 1998.
Freret et al., Applications of Spread-Spectrum Radio to Wireless Terminal Communications, Conf. Record, Nat'l Telecom. Conf., Nov. 30-Dec. 4, 1980.
Fortune et al., IEEE Computational Science and Engineering, "Wise Design of Indoor Wireless Systems: Practical Computation and Optimization", p. 58-68 (1995).
Geier, Jim, Wireless Lans Implementing Interoperable Networks, Chapter 3 (pp. 89-125) Chapter 4 (pp. 129-157) Chapter 5 (pp. 159-189) and Chapter 6 (pp. 193-234), 1999, United States.
Ho et al., "Antenna Effects on Indoor Obstructed Wireless Channels and a Deterministic Image-Based Wide-Based Propagation Model for In-Building Personal Communications Systems", International Journal of Wireless Information Networks, vol. 1, No. 1, 1994.
Kim et al., "Radio Propagation Measurements and Prediction Using Three-Dimensional Ray Tracing in Urban Environments at 908 MHz and 1.9 GHz", IEEE Transactions on Vehicular Technology, vol. 48, No. 3, May 1999.
Kleinrock and Scholl, Conference record 1977 ICC vol. 2 of 3, Jun. 12-15 Chicago Illinois "Packet Switching in radio Channels: New Conflict-Free Multiple Access Schemes for a Small Number of data Useres", (1977).
LAN/MAN Standars Committee of the IEEE Computer Society, Part 11:Wireless LAN Medium Access Control (MAC) and Physical Layer (PHY) Specifications:Higher Speed Physical Layer Extension in the 2.4 GHz Band, IEEE Std. 802.11b (1999).
Okamoto and Xu, IEEE, Proceeding so of the $13^{th}$ Annual Hawaii International Conference on System Sciences, pp. 54-63 (1997).
Panjwani et al., "Interactive Computation of Coverage Regions for Wireless Communication in Multifloored Indoor Environments", IEEE Journal on Selected Areas in Communications, vol. 14, No. 3, Apr. 1996.
Perram and Martinez, "Technology Developments for Low-Cost Residential Alarm Systems", Proceedings 1977 Carnahan Conference on Crime Countermeasures, Apr. 6-8, pp. 45-50 (1977).
Piazzi et al., "Achievable Accuracy of Site-Specific Path-Loss Predictions in Residential Environments", IEEE Transactions on Vehicular Technology, vol. 48, No. 3, May 1999.
Seidel et al., "Site-Specific Propagation Prediction for Wireless In-Building Personal Communications System Design", IEEE Transactions on Vehicular Technology, vol. 43, No. 4, Nov. 1994.
Skidmore et al., "Interactive Coverage Region and System Design Simulation for Wireless Communication Systems in Multi-floored Indoor Environments, SMT Plus" IEEE ICUPC '96 Proceedings (1996).
Ullmo et al., "Wireless Propagation in Buildings: A Statistic Scattering Approach", IEEE Transactions on Vehicular Technology, vol. 48, No. 3, May 1999.
U.S. Appl. No. 11/487,722, filed Jul. 2006, Simons et al.
U.S. Appl. No. 11/592,891, filed Nov. 2006, Murphy, James.
U.S. Appl. No. 11/595,119, filed Nov. 2006, Murphy, James.
U.S. Appl. No. 11/604,075, filed Nov. 2006, Murphy et al.
U.S. Appl. No. 11/643,329, filed Dec. 2006, Towari, Manish.
U.S. Appl. No. 11/648,359, filed Dec. 2006, Gast et al.
U.S. Appl. No. 11/690,654, filed Mar. 2007, Keenly et al.
U.S. Appl. No. 11/845,029, filed Aug. 2007, Gast, Mathew.
U.S. Appl. No. 11/852,234, filed Sep. 2007, Gast et al.
U.S. Appl. No. 11/944,346, filed Nov. 2007, Gast, Mathew S.
U.S. Appl. No. 11/966,912, filed Dec. 2007, Chesnutt et al.
U.S. Appl. No. 11/970,484, filed Jan. 2008, Gast, Mathew S.
U.S. Appl. No. 11/975,134, filed Oct. 2007, Aragon et al.
U.S. Appl. No. 12/077,051, filed Mar. 2008, Gast, Mathew S.
Puttini, R., Percher, J., Me, L., and de Sousa, R. 2004. A fully distributed IDS for MANET. In *Proceedings of the Ninth international Symposium on Computers and Communications 2004* vol. 2 (Iscc"04)—vol. 02 (Jun. 28-Jul. 1, 2004). ISCC. IEEE Computer Society, Washington, DC, 331-338.

(56) References Cited

OTHER PUBLICATIONS

P. Martinez, M. Brunner, J. Quittek, F. Straus, J. Schonwlder, S. Mertens, T. Klie "Using the Script MIB for Policy-based Configuration Management", Technical University Braunschweig, Braunschweig, Germany, 2002.
Law, A., "New Service Discovery Protocol," Internet Citation [Online] XP002292473 Retrieved from the Internet: <URL: http://sem.uccalgary.ca~lawa/SENG60921/arch/SDP.htm> [retrieved Aug. 12, 2004] (15 pages).
P. Bahl et al., RADAR: An In-Building RF-based User Location and Tracking System, Microsoft Research, Mar. 2000, 10 pages.
Latvala J. et al., Evaluation of RSSI-Based Human Tracking, Proceedings for the 2000 European Signal Processing Conference, Sep. 2000, 9 pages.
Bahl P. et al. "User Location and Tracking in an In-Building Radio Network," Microsoft Research, Feb. 1999, 13 pages.
P. Bahl et al., A Software System for Locating Mobile Users: Design, Evaluation, and Lessons, Microsoft Research, Feb. 1999, 13 pages.
Chen, Yen-Chen et al., "Enabling Location-Based Services on Wireless LANs", Networks, 2003. ICON2003. The 11th IEEE International Conference, Sep. 28-Oct. 1, 2003, pp. 567-572.
Erten, Y. Murat, "A Layered Security Architecture for Corporate 802.11 Wireless Networks", Wireless Telecommunications Symposium, May 14-15, 2004, pp. 123-128.
Kleine-Ostmann, T., et al., "A Data Fusion Architecture for Enhanced Position Estimation in Wireless Networks," IEEE Communications Letters, vol. 5(8), Aug. 2001, p. 343-345.
Pulson, Time Domain Corporation, Ultra wideband (UWB) Radios for Precision Location, Third IEEE Workshop on Wireless Local Area Networks, Sep. 27-28, 2001, 8 pages.
Barber, S., Monitoring 802.1 Networks, IEEE 802.11, Sydney, NSW, May 13-17, 2002.
Latvala, J. et al. "Patient Tracking in a Hospital Environment Using Extended Kalman-filtering," Proceedings of the 1999 Middle East Conference on Networking, Nov. 1999, 5 pages.
Myllymaki, P. et al., "A Probabilistic Approach to WLAN User Location Estimation," Third IEEE Workshop on Wireless Local Area Networks, Sep. 27-28, 2001, 12 pages.
Potter, B., and Fleck, B., 802.11 Security, O'Reilly Media Inc., Dec. 2002, 14 pages.
McCann, S., et al., "Emergency Services for 802," IEEE 802.11-07/0505r1, Mar. 2007, 27 pages.
Di Sorte, D., et al., "On the Performance of Service Publishing in IEEE 802.11 Multi-Access Environment," IEEE Communications Letters, vol. 11, No. 4, Apr. 2007, 3 pages.
Microsoft Computer Dictionary, Fifth Edition, Microsoft Corporation, 2002, 2 pages.
Thomson, Allan, Cisco Systems, AP Power Down Notification, Power Point slide show; IEEE standards committee meeting Jul. 15, 2008; doc.: IEEE 802.11-08/0759r0, 14 pages.
3COM, Wireless LAN Mobility System: Wireless LAN Switch and Controller Configuration Guide, 3COM, Revision A, Oct. 2004, 476 pages.
3COM, Wireless LAN Switch Manager (3WXM), 3COM, Revision C, Oct. 2004, 8 pages.
3COM, Wireless LAN Switch and Controller; Quick Start Guide, 3COM, Revision B, Nov. 2004, 10 pages.
3COM, Wireless LAN Mobility System; Wireless LAN Switch and Controller Installation and Basic Configuration Guide, Revision B, Apr. 2005, 496 pages.
Johnson, David B, et al., "DSR The Dynamic Source Routing Protocol for Multi-Hop Wireless Ad Hoc Networks," Computer Science Department, Carnegie Mellon University, Nov. 3, 2005 (http://monarch.cs.rice.edu/monarch-papers/dsr-chapter00.pdf).
Information Sciences Institute, RFC-791—Internet Protocol, DARPA, Sep. 1981.
Aerohive Blog, posted by Devin Akin, Cooperative Control: Part 3, [Online] Retrieved from the Internet: <URL: http://blog.aerohive.com/blog/?p=71> Mar. 1, 2010 (3 pages).
Wikipedia, Wireless LAN, 2 definitions for wireless LAN roaming, [Online] [retrieved Oct. 4, 2010] Retrieved from the Internet: <URL: http://en.wikipedia.org/wiki/Wireless_LAN> (1 page).
U.S. Appl. No. 12/957,997, filed Dec. 1, 2010.
U.S. Appl. No. 12/603,391, filed Oct. 21, 2009.
U.S. Appl. No. 12/763,057, filed Apr. 19, 2010.
U.S. Appl. No. 13/006,950, filed Jan. 14, 2011.
U.S. Appl. No. 09/866,474, filed May 29, 2001.
U.S. Appl. No. 13/017,801, filed Jan. 31, 2011.
Office Action for U.S. Appl. No. 11/784,307, mailed Sep. 22, 2009.
Final Office Action for U.S. Appl. No. 11/784,307, mailed Jun. 14, 2010.
Non-Final Office Action for U.S. Appl. No. 11/377,859, mailed Jan. 8, 2008.
Final Office Action for U.S. Appl. No. 11/377,859, mailed Aug. 27, 2008.
Office Action for U.S. Appl. No. 12/401,073, mailed Aug. 23, 2010.
Final Office Action for U.S. Appl. No. 12/401,073, mailed Apr. 1, 2011.
Office Action for U.S. Appl. No. 12/401,073, mailed Sep. 20, 2011.
Office Action for U.S. Appl. No. 11/326,966, mailed Nov. 14, 2008.
Office Action for U.S. Appl. No. 12/500,392, mailed Jun. 20, 2011.
Office Action for U.S. Appl. No. 11/400,165, mailed Aug. 19, 2008.
Office Action for U.S. Appl. No. 12/489,295, mailed Apr. 27, 2011.
Office Action for U.S. Appl. No. 11/330,877, mailed Sep. 11, 2008.
Final Office Action for U.S. Appl. No. 11/330,877, mailed Mar. 13, 2009.
Office Action for U.S. Appl. No. 11/330,877, mailed Aug. 6, 2009.
Final Office Action for U.S. Appl. No. 11/330,877, mailed Apr. 22, 2010.
Office Action for U.S. Appl. No. 11/330,877, mailed Jan. 13, 2011.
Final Office Action for U.S. Appl. No. 11/330,877, mailed May 27, 2011.
Office Action for U.S. Appl. No. 11/351,104, mailed Oct. 28, 2008.
Office Action for U.S. Appl. No. 11/351,104, mailed Dec. 2, 2009.
Final Office Action for U.S. Appl. No. 11/351,104, mailed Jun. 10, 2009.
Office Action for U.S. Appl. No. 11/351,104, mailed May 26, 2010.
Office Action for U.S. Appl. No. 11/351,104, mailed Nov. 29, 2010.
Office Action for U.S. Appl. No. 11/351,104, mailed Jul. 26, 2011.
Office Action for U.S. Appl. No. 11/437,537, mailed Dec. 23, 2008.
Final Office Action for U.S. Appl. No. 11/437,537, mailed Jul. 16, 2009.
Office Action for U.S. Appl. No. 11/331,789, mailed Jun. 13, 2008.
Final Office Action for U.S. Appl. No. 11/331,789, mailed Oct. 23, 2008.
Office Action for U.S. Appl. No. 11/331,789, mailed Aug. 5, 2009.
Office Action for U.S. Appl. No. 12/785,362, mailed Apr. 22, 2011.
Office Action for U.S. Appl. No. 11/417,830, mailed Nov. 14, 2008.
Final Office Action for U.S. Appl. No. 11/417,830, mailed May 28, 2009.
Office Action for U.S. Appl. No. 11/417,993, mailed Oct. 29, 2008.
Office Action for U.S. Appl. No. 12/370,562, mailed Sep. 30, 2010.
Office Action for U.S. Appl. No. 12/370,562, mailed Apr. 6, 2011.
Office Action for U.S. Appl. No. 11/592,891, mailed Jan. 15, 2009.
Final Office Action for U.S. Appl. No. 11/592,891, mailed Jul. 20, 2009.
Office Action for U.S. Appl. No. 11/595,119, mailed Jul. 21, 2009.
Final Office Action for U.S. Appl. No. 11/595,119, mailed Jan. 5, 2010.
Office Action for U.S. Appl. No. 11/595,119, mailed Aug. 19, 2010.
Final Office Action for U.S. Appl. No. 11/595,119, mailed Aug. 2, 2011.
Office Action for U.S. Appl. No. 11/604,075, mailed May 3, 2010.
Office Action for U.S. Appl. No. 11/845,029, mailed Jul. 9, 2009.
Final Office Action for U.S. Appl. No. 11/845,029, mailed Jan. 25, 2010.
Office Action for U.S. Appl. No. 11/845,029, mailed May 14, 2010.
Final Office Action for U.S. Appl. No. 11/845,029, mailed Dec. 9, 2010.
Office Action for U.S. Appl. No. 11/845,029, mailed Sep. 27, 2011.
Office Action for U.S. Appl. No. 11/437,538, mailed Dec. 22, 2008.

(56) References Cited

OTHER PUBLICATIONS

Final Office Action for U.S. Appl. No. 11/437,538, mailed Jun. 10, 2009.
Office Action for U.S. Appl. No. 11/437,387, mailed Dec. 23, 2008.
Final Office Action for U.S. Appl. No. 11/437,387, mailed Jul. 15, 2009.
Office Action for U.S. Appl. No. 11/437,582, mailed Jan. 8, 2009.
Final Office Action for U.S. Appl. No. 11/437,582, mailed Jul. 22, 2009.
Office Action for U.S. Appl. No. 12/304,100, mailed Jun. 17, 2011.
Office Action for U.S. Appl. No. 11/487,722, mailed Aug. 7, 2009.
Office Action for U.S. Appl. No. 11/643,329, mailed Jul. 9, 2010.
Office Action for U.S. Appl. No. 11/648,359, mailed Nov. 19, 2009.
Office Action for U.S. Appl. No. 11/944,346, mailed Nov. 23, 2010.
Office Action for U.S. Appl. No. 12/077,051, mailed Dec. 28, 2010.
Office Action for U.S. Appl. No. 12/113,535, mailed Apr. 21, 2011.
Office Action for U.S. Appl. No. 11/852,234, mailed Jun. 29, 2009.
Office Action for U.S. Appl. No. 11/852,234, mailed Jan. 21, 2010.
Office Action for U.S. Appl. No. 11/852,234, mailed Aug. 9, 2010.
Office Action for U.S. Appl. No. 11/852,234, mailed Apr. 27, 2011.
Office Action for U.S. Appl. No. 11/970,484, mailed Nov. 24, 2010.
Final Office Action for U.S. Appl. No. 11/970,484, mailed Jul. 22, 2011.
Office Action for U.S. Appl. No. 12/172,195, mailed Jun. 1, 2010.
Office Action for U.S. Appl. No. 12/172,195, mailed Nov. 12, 2010.
Office Action for U.S. Appl. No. 12/336,492, mailed Sep. 15, 2011.
Office Action for U.S. Appl. No. 12/210,917, mailed Nov. 15, 2010.
Final Office Action for U.S. Appl. No. 12/210,917, mailed May 13, 2011.
Office Action for U.S. Appl. No. 12/350,927, mailed Augiat 17, 2011.
Office Action for U.S. Appl. No. 12/365,891, mailed Aug. 29, 2011.
Office Action for U.S. Appl. No. 10/235,338, mailed Jan. 8, 2003.
Office Action for U.S. Appl. No. 11/094,987, mailed Dec. 27, 2007.
Final Office Action for U.S. Appl. No. 11/094,987, mailed May 23, 2008.
Office Action for U.S. Appl. No. 11/094,987, mailed Oct. 21, 2008.
Office Action for U.S. Appl. No. 12/474,020, mailed Jun. 3, 2010.
Final Office Action for U.S. Appl. No. 12/474,020, mailed Oct. 4, 2010.
Office Action for U.S. Appl. No. 09/866,474, mailed Nov. 30, 2004.
Final Office Action for U.S. Appl. No. 09/866,474, mailed Jun. 10, 2005.
Office Action for U.S. Appl. No. 10/667,027, mailed Jul. 29, 2005.
Final Office Action for U.S. Appl. No. 10/667,027, mailed Mar. 10, 2006.
Office Action for U.S. Appl. No. 10/667,027, mailed May 5, 2006.
Final Office Action for U.S. Appl. No. 10/667,027, mailed Feb. 26, 2007.
Office Action for U.S. Appl. No. 10/666,848, mailed Mar. 22, 2007.
Office Action for U.S. Appl. No. 10/667,136, mailed Jan. 25, 2006.
Office Action for U.S. Appl. No. 10/667,136, mailed Aug. 28, 2006.
Final Office Action for U.S. Appl. No. 10/667,136, mailed Mar. 9, 2007.
International Search Report and Written Opinion for PCT/US05/004702, mailed Aug. 10, 2006.
International Search Report and Written Opinion for PCT/US2006/009525, mailed Sep. 13, 2007.
International Search Report and Written Opinion for PCT/US06/40500, mailed Aug. 17, 2007.
International Search Report and Written Opinion for PCT/US06/40498, mailed Dec. 28, 2007.
International Search Report and Written Opinion for PCT/US2007/012194 dated Feb. 4, 2008.
International Search Report and Written Opinion for PCT/US06/40499, mailed Dec. 13, 2007.
International Search Report and Written Opinion for PCT/US2007/19696, mailed Feb. 29, 2008.
International Search Report and Written Opinion for PCT/US2007/12016, mailed Jan. 4, 2008.
International Search Report and Written Opinion for PCT/US2007/012195, mailed Mar. 19, 2008.
International Search Report and Written Opinion for PCT/US07/013758 mailed Apr. 3, 2008.
First Office Action for Chinese Application No. 2007800229623.X, mailed Dec. 31, 2010.
International Search Report and Written Opinion for PCT/US07/013757, mailed Jan. 22, 2008.
International Search Report and Written Opinion for PCT/US07/14847, mailed Apr. 1, 2008.
International Search Report and Written Opinion for PCT/US07/089134, mailed Apr. 10, 2008.
International Search Report and Written Opinion for PCT/US2008/010708, mailed May 18, 2009.
Office Action for Canadian Application No. 2,638,754, mailed Oct. 3, 2011.
Supplementary Partial European Search Report for European Application No. 02770460, mailed Aug. 20, 2004.
Supplementary Partial European Search Report for European Application No. 02770460, mailed Dec. 15, 2004.
Examination Report for European Application No. 02770460, Mar. 18, 2005.
Summons for Oral Hearing Proceedings for European Application No. 02770460, Jan. 31, 2006.
International Search Report for PCT/US02/28090, mailed Aug. 13, 2003.
International Preliminary Examination Report for PCT/US02/28090, mailed Oct. 29, 2003.
Examination Report for European Application No. 06006504, mailed Oct. 10, 2006.
English Translation of Office Action for Japanese Application No. 2006-088348, mailed Jan. 4, 2011.
International Search Report and Written Opinion for PCT/US04/30769, mailed Oct. 4, 2005.
International Search Report and Written Opinion for PCT/US04/30683, mailed Feb. 10, 2006.
International Search Report and Written Opinion for PCT/US04/30684, mailed Feb. 10, 2006.
U.S. Appl. No. 13/447,656, filed Apr. 16, 2012.
U.S. Appl. No. 13/396,124, filed Feb. 14, 2012.
U.S. Appl. No. 13/437,669, filed Apr. 2, 2012.
U.S. Appl. No. 13/437,673, filed Apr. 2, 2012.
Final Office Action for U.S. Appl. No. 12/489,295, mailed Jan. 18, 2012.
Office Action for U.S. Appl. No. 11/351,104, mailed Feb. 15, 2012.
Office Action for U.S. Appl. No. 12/370,562, mailed Jan. 17, 2012.
Office Action for U.S. Appl. No. 12/683,281, mailed Jan. 20, 2012.
Final Office Action for U.S. Appl. No. 12/304,100, mailed Feb. 2, 2012.
Final Office Action for U.S. Appl. No. 12/077,051, mailed Oct. 25, 2011.
Final Office Action for U.S. Appl. No. 12/113,535, mailed Jan. 3, 2012.
Office Action for U.S. Appl. No. 12/113,535, mailed Apr. 20, 2012.
Final Office Action for U.S. Appl. No. 11/852,234, mailed Jan. 20, 2012.
Office Action for U.S. Appl. No. 12/210,917, mailed Dec. 5, 2011.
Final Office Action for U.S. Appl. No. 12/350,927, mailed Jan. 18, 2012.
Second Office Action for Chinese Application No. 2007800229623.X, mailed Mar. 7, 2012.
Extended Supplementary European Search Report for Application No. 07796005.2, mailed Feb. 14, 2012.
Office Action for U.S. Appl. No. 13/396,124, mailed May 7, 2012.
Office Action for U.S. Appl. No. 13/437,669, mailed May 30, 2012.
Office Action for U.S. Appl. No. 13/437,673, mailed May 30, 2012.
Office Action for U.S. Appl. No. 12/304,100, mailed May 29, 2012.
Office Action for U.S. Appl. No. 11/970,484, mailed Jun. 20, 2012.
Final Office Action for U.S. Appl. No. 12/336,492, mailed Jun. 15, 2012.

(56) References Cited

OTHER PUBLICATIONS

Sangheon Pack et al. "Fast-handoff support in IEEE 802.11 wireless networks," IEEE Communications Surveys, IEEE, NY, NY, vol. 9, No. 1, Jan. 1, 2007 (pp. 2-12) ISSN: 1553-877X.
Extended Search Report for European Application No. 11188566.1, mailed Jan. 30, 2012.
Office Action for U.S. Appl. No. 12/957,997, mailed Aug. 28, 2012.
Final Office Action for U.S. Appl. No. 11/351,104, mailed Aug. 14, 2012.
Non-Final Office Action for U.S. Appl. No. 11/351,104, mailed Dec. 17, 2012.
Final Office Action for U.S. Appl. No. 12/370,562, mailed Jul. 26, 2012.
Final Office Action for U.S. Appl. No. 12/683,281, mailed Sep. 21, 2012.
Final Office Action for U.S. Appl. No. 12/304,100, mailed Dec. 11, 2012.
Office Action for U.S. Appl. No. 13/568,861, mailed Oct. 24, 2012.
Third Office Action for Chinese Application No. 200780029623.X, mailed Sep. 29, 2012.
European Examination Report for Application No. 07796005.2, mailed Sep. 4, 2012.

* cited by examiner

UNTETHERED ACCESS POINT MESH SYSTEM AND METHOD

CROSS-REFERENCE TO RELATED APPLICATIONS

This application claims the benefit of U.S. Patent Application No. 60/812,403, filed Jun. 9, 2006, which is incorporated by reference.

BACKGROUND

An access point (AP) is a device used by wireless clients to connect to a network. An AP functions as a standalone entity in some implementations and functions in cooperation with distribution hardware in other implementations. Distribution hardware may include a wireless switch used to manage APs and provide network-connectivity to wireless clients. A wireless domain may refer to a group of wireless switches that are configured to exchange relevant information, and using this information make informed decisions. A known device is a station (e.g., a wireless AP or client device) that is part of a network wireless installation.

Trapeze Networks, Inc. (Trapeze), uses a MOBILITY POINT™ (MP®) APs in a MOBILITY DOMAIN™ wireless domain. An MP® AP is coupled to a MOBILITY EXCHANGE® (MX®) wireless switch. Trapeze uses MOBILITY DOMAIN™ to refer to a collection of MX® switches. This collection of MX® switches shares RF environment and station association information. This information is used by the MX® switches to support features including by way of example but not limitation roaming, auto channel selection, rogue AP detection, intrusion detection and/or the launching of countermeasures. Some additional details regarding the Trapeze-specific implementation is provided by way of example but not limitation, including novel features that are discussed later in this application, in the provisional application to which this application claims priority.

In a typical implementation, APs are coupled to a switch via a wire. Implementations that include untethered APs (UAPs), introduce additional configuration difficulties that are only recently being explored. This is an area that is ripe for experimentation and innovation because it has proven challenging to find a way to scale wireless domains using UAPs.

These are but a subset of the problems and issues associated with wireless access point authentication, and are intended to characterize weaknesses in the prior art by way of example. The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

A technique for implementing an untethered access point (UAP) mesh involves enabling AP-local switching at one or more UAPs of the mesh. A system constructed according to the technique may include a wireless switch; an access point (AP) wire-coupled to the wireless switch; and a UAP mesh, wirelessly coupled to the AP, including a UAP with an AP-local switching engine embodied in a computer-readable medium. The system may or may not further include a wired backbone coupled to a wired network including the wireless switch. The UAP mesh may or may not be self-healing. A spanning-tree algorithm may or may not be embodied in a computer readable medium of the UAP mesh. The wireless switch may or may not include an authorization engine, embodied in a computer-readable medium, for acting in concert with an anchoring AP to authorize a downstream station. The AP-local switching engine may or may not make use of a station switching record (SSR) stored a the UAP.

Another system constructed according to the technique may include an untethered access point (UAP), including: a radio; a backhaul service set identifier (SSID) stored in a computer-readable medium; an anchor access point (AAP) selection engine embodied in a computer-readable medium. In operation, the AAP selection engine may use the radio to attempt to associate with the AAP if a beaconed backhaul SSID matches the stored backhaul SSID. The UAP may or may not further include a bootable image stored in a computer readable medium, wherein, in operation, the UAP boots up using the bootable image. The UAP may or may not use regulatory domain information to ensure the UAP is operating within regulatory limits before receiving a complete configuration. The AAP selection engine may or may not listen for a beacon from an AAP that includes the backhaul SSID. The AAP may or may not include a backhaul SSID stored in a computer-readable medium. The AAP may or may not include an authentication engine embodied in a computer-readable medium, wherein, in operation, the authentication engine works in concert with upstream components to authenticate the UAP. The AAP may or may not include a backhaul radio; a backhaul radio and service profile stored in a computer-readable medium; wherein, in operation, when the UAP is associated to the AAP, the backhaul radio sends messages from the UAP upstream using the backhaul radio and service profile. The AAP may or may not be configured to anchor the UAP and a limited number of additional UAPs.

A method according to the technique may include beaconing with a backhaul SSID; acting in concert with an upstream switch as an authenticator for a downstream station that responds to the beacon; providing limited local switching functionality for the downstream station. The method may or may not further include sending a station switching record (SSR) from the upstream switch to the downstream station; receiving the SSR from the downstream station; storing the SSR locally and sending the SSR upstream to a next upstream hop. The method may or may not further include receiving in an initial configuration the backhaul SSID; listening for a beacon with the backhaul SSID; attempting to associate with an anchoring AP that is beaconing with the backhaul SSID; if association is successful, receiving a station switching record (SSR) from the upstream switch, storing the SSR locally, and passing the SSR upstream.

The proposed system can offer, among other advantages, improved wireless domain scaling capabilities. This and other advantages of the techniques described herein will become apparent to those skilled in the art upon a reading of the following descriptions and a study of the several figures of the drawings.

BRIEF DESCRIPTION OF THE DRAWINGS

Embodiments of the invention are illustrated in the figures. However, the embodiments and figures are illustrative rather than limiting; they provide examples of the invention.

DETAILED DESCRIPTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments, of the invention.

Figure 1:
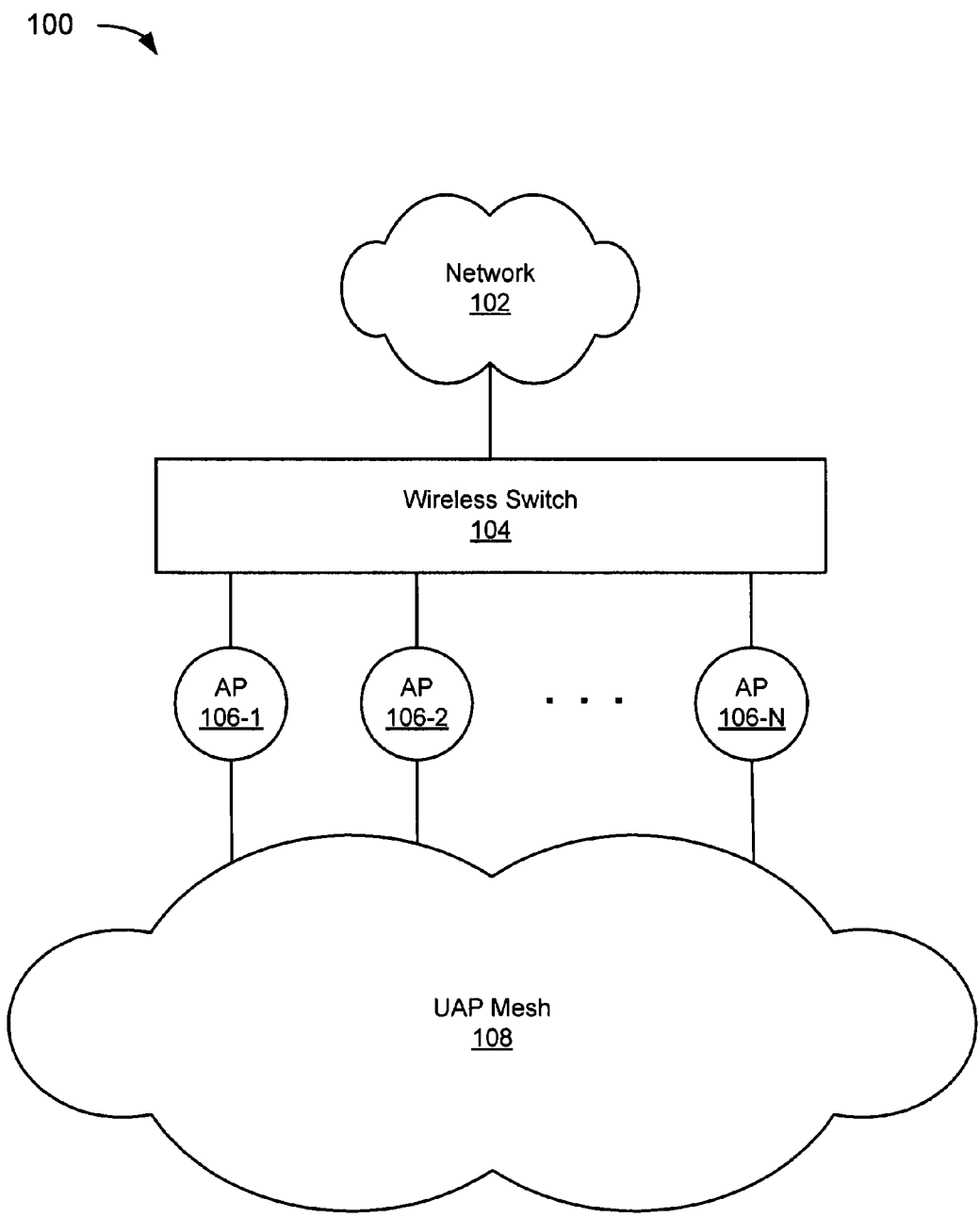
FIG. 1 depicts an example of a system including an untethered access point (UAP) mesh.

FIG. 1 depicts an example of a system 100 including an untethered access point (UAP) mesh. In the example of FIG. 1, the system 100 includes a network 102, a wireless switch 104, one or more APs 106-1 to 106-N (referred to collectively as APs 106), and a UAP mesh 108.

The network 102 may include an Internet protocol (IP) network. In an embodiment, the network 102 is a wired backbone to which the wireless switch 104 is coupled. However, the network 102 may alternatively represent the network, or any other network, to which a backbone network is coupled or which acts as an alternative to a backbone network. Thus, the network 102 could include, for example, the Internet.

The wireless switch 104 is typically wire connected to the APs 106. Thus, the "wireless" switch could be thought of, depending upon the implementation, as a switch for wireless traffic to and/or from a wired network. The wireless switch 104 is not necessarily wirelessly connected to anything. Each of the APs 106 could be wire coupled to respective switches such that each switch is wire coupled to only a single AP. So, although the one or more APs 106 is depicted as a plurality in the example of FIG. 1, it should be understood that the number of APs per switch is implementation- and/or embodiment-specific. An AP and the wireless switch 104 could be combined into a single device. However, in this description, the functionality of an AP is differentiated from the functionality of a switch by acting as if the APs and the wireless switches are distinct devices.

The wireless switch 104 may or may not have all of the tools to manage wireless stations and the UAP mesh locally. For example, there may be additional management (e.g., AAA servers) further upstream from the wireless switch 104. Since it is not critical where these services take place beyond the wireless switch 104, for illustrative simplicity, it is assumed that the wireless switch 104 handles all of these functions, either locally or by utilizing upstream components. For this reasons, the figures (other than FIG. 1) do not depict components further upstream from the wireless switch 104.

Wireless data may include, by way of example but not limitation, station association data and RF environment data. The station and RF data is used by the wireless switches 104 to support features including, by way of example but not limitation, roaming, auto channel selection, rogue AP detection, intrusion detection and the launching of countermeasures. The wireless switch 104 may share wireless data with other wireless switches (not shown).

The wireless switch 104 controls the APs 106 (and the APs in the UAP mesh 108). In an embodiment, the APs 106 include radio transmitters and receivers (e.g., transceivers) that are used to provide wireless network connectivity for users and station access to the functions of the wireless switch 104. Within an IEEE 802.11 context, a station is any IEEE 802.11 entity or the equivalent in other related standards, and it may be roaming or stationary. It should be noted that this definition may include APs.

Each of the APs 106 anchors at least a portion of the UAP mesh 108 to the wired network. The APs 106 may be treated as border devices between the wireless switch 104 (or other upstream components of the system 100) and the UAP mesh 108. This enables more efficient use of wireless resources because proxy address resolution protocol (proxy ARP) may be used to enable the APs 106 to answer ARP requests on behalf of a remote device (e.g., a UAP for which an AP serves as an anchor to the wireless switch 104).

In the example of FIG. 1, the UAP mesh 108 is intended to depict a plurality of potentially discrete APs that do not have a wired connection to the wireless switch 104 or to the APs 106. That is why the APs in the wireless mesh are referred to as "untethered." Any station in the UAP mesh 108, whether a UAP or some other wireless station, is anchored to the wireless switch 104 by the AP 106 and zero or more UAPs that make up a chain of nodes from the station to the AP 106. An AP that is closer to the wireless switch 104 in the chain may be referred to as anchoring downstream stations. For any given station, the path from the station to the wireless switch 104 may be referred to as a spanning tree because the UAP mesh 108 should not allow loops for traffic passing between a station and the wireless switch 104.

When a UAP in the UAP mesh 108 is brought online, it will attempt to reach the wireless switch 104 through a path that is optimal. (Note: Although an optimal path is desired, it may or may not be accomplished in practice, depending upon the implemented algorithm and/or environmental factors). There are multiple metrics for measuring the distance of a UAP from one of the APs 106. For example, the metric may be time. That is, the amount of time it takes for a packet to travel between the UAP and the AP anchoring the UAP. Although such a metric may work fine, it will typically vary depending upon environmental factors, such as traffic congestion or degraded received signal strength. For simplicity, the metric used herein is the number of hops between the UAP and the anchoring AP (AAP), with the understanding that this is but one of many potential metrics. Thus, if a UAP is one hop away from the AAP, the UAP may be referred to as a one-hop UAP. In general, a UAP may be referred to as an N-hop UAP where the UAP is N hops from the AAP.

Advantageously, UAPs of the UAP mesh 108 may include an AP-local switching engine embodied in a computer-readable medium. An AP-local switching engine may make use of a station switching record (SSR) to determine how to switch a given message unit (e.g., a packet, frame, datagram, etc.). This enables at least some traffic to be efficiently switched within the UAP mesh 108. Moreover, advantageously, some traffic may be tunneled back to a switch, while other traffic is locally switched. Which traffic is tunneled back, and which traffic is locally switched, is an implementation-specific decision that becomes available by using the teachings described herein.

It will be appreciated in light of the description provided herein that although aspects of the invention are described relative to IEEE 802.11 standards, and that certain embodiments have particular features that are implemented within the 802.11 context, the invention itself is not limited to 802.11 networks and may generally be applied to any applicable wireless network; and to the extent that future technological enhancements might obscure the distinctions between wireless switches, APs, and/or stations, the invention is understood to include components providing the features of such switches, APs, and stations independently of how they are packaged, combined, or labeled.

In an illustrative embodiment, the UAP mesh 108 is created from a spanning tree. Each station in the UAP mesh 108 attempts to reach the wireless switch 104 along an optimal path. Assuming the optimal path is measured in the number of hops to the wire, if a first station's traffic passes through a UAP and along a path from there to the wire, a second station's traffic that passes through the UAP will take the same path from there to the wire. Since all stations take the optimal path, the stations may be represented as edge nodes of a tree where the AP at the wire is the root node. Thus, the AP mesh acts as a spanning tree for each station. It may be noted that the spanning tree is greedy at each node, which naturally results in an efficient (perhaps even optimized) tree flow.

Figure 2:
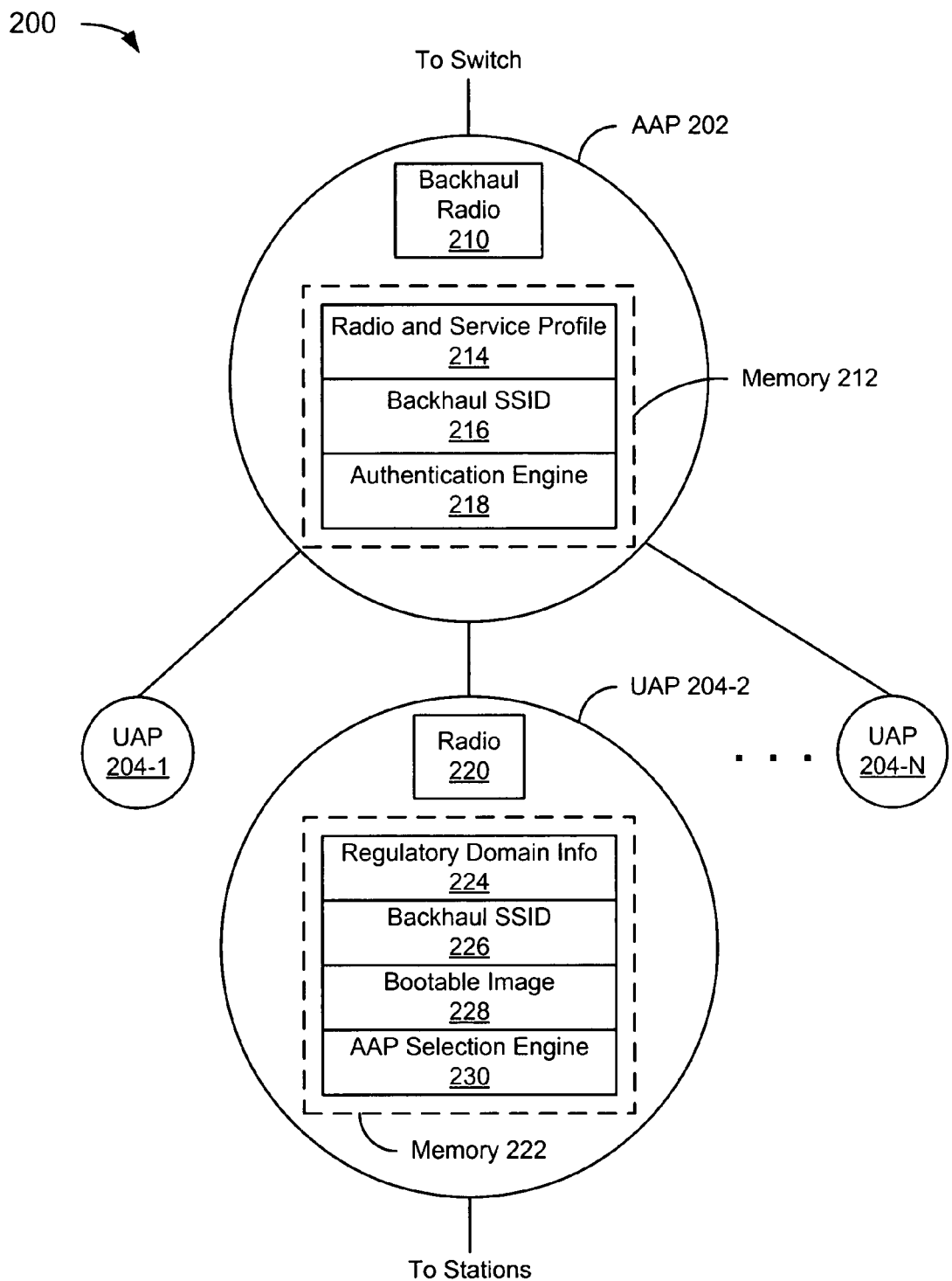
FIG. 2 depicts an example of a subtree of a UAP mesh.

FIG. 2 depicts an example of a subtree 200 of a UAP mesh. The subtree 200 includes an anchor AP (AAP) 202, and one or more UAPs 204-1 to 204-N (referred to collectively as UAPs 204). The path upstream from the AAP 202 to the switch may include no hops, if the AAP 202 is a (tethered) AP; one hop, if the AAP 202 is wirelessly coupled directly to a (tethered) AP, or a chain of UAP nodes; or multiple hops, if the path from the AAP 202 to the switch includes a chain of UAPs. The path downstream from the UAP 204-2 may include multiple jumps, as well. However, it should be noted that if the stations are not wirelessly coupled directly to the UAP 204-2, the UAP 204-2 is actually an AAP (i.e., the UAP 204-2 would be anchoring downstream UAPs).

In the example of FIG. 2, the AAP 202 includes a backhaul radio 210 and memory 212. The number of UAPs 204 that are anchored by the AAP 202 may be implementation- or embodiment-specific. For example, a particular installation may limit the number of UAPs 204 to, e.g., five.

The backhaul radio 210 may be a radio that is dedicated to transmitting data associated with the UAPs 204. Whether the radio is dedicated to backhauling is an implementation-specific decision. Since there may be multiple radio and SSID configurations per radio-profile, the radio may be used to perform both the backhaul function and other, e.g., 802.11 services. However, it is expected that many customers who implement backhaul services will dedicate a radio to backhaul services because the backhaul link is an important one. In an illustrative embodiment, the backhaul radio 210 is capable of passive scan and active scan. However, it should be noted that in some implementations, best practice may advice against active scan. The channel and power settings are often hard configured so auto-tuning may not be available and may even be undesirable. The ability to change the backhaul channel and force all UAPs to do likewise without dropping any sessions would potentially make auto-tuning more viable. The AAP 202 may or may not include one or more radios (not shown) in addition to the backhaul radio 210.

The memory 212 includes a plurality of modules, some of which are depicted in FIG. 2 for illustrative purposes. A processor (not shown) is coupled to the memory 212 in a manner that is well-known in the relevant arts. The memory 212 is intended to represent any of a plurality of known or convenient computer-readable mediums, including non-volatile storage, RAM, flash memory, cache, etc. Any applicable computer-readable medium may be used.

In the example of FIG. 2, the memory 212 includes a backhaul radio and service profile module 214, a backhaul service set identifier (SSID) 216, and an authentication engine 218. The backhaul radio and service profile module 214 includes data to be used in association with the backhaul. The backhaul SSID 216 identifies the support network. The authentication engine 218 facilitates authentication of wireless stations (including UAPs). In an illustrative embodiment, the authentication engine 218 authenticates a station in concert with a switch or other upstream component. The station or upstream component may assist in the authentication "on the fly" when a wireless station attempts to associate with the AAP 202, or in advance for a pre-authorized wireless station. In an embodiment that does not have (or has more limited) centralized management, the authentication engine 218 could even be configured to authenticate without the assistance of a switch or other upstream component.

The AAP 202 may be configured to beacon the backhaul SSID 216. The service profile is then associated to a radio profile and AP following known or convenient conventions. Since backhaul services will be applied to specific APs in at least one embodiment, general AP-configuration policies (such as auto-dap templates) that can apply to unspecific APs are not enabled in this embodiment. They may be enabled in other embodiments, however.

In the example of FIG. 2, the UAP 204-2 includes a radio 220 and memory 222. Details of other ones of the UAPs 204 are omitted to avoid cluttering the figure. Each of the UAPs 204 may be identical to, similar to, or different from the UAP 204-2. The radio 220 may or may not be a dedicated backhaul radio. The value of making the radio 220 into a dedicated backhaul radio diminishes if the UAP 204-2 is at the edge of a UAP mesh (e.g., when there are no downstream UAPs), though the value may or may not be diminished to zero.

The memory 222 includes regulatory domain information 224, a backhaul SSID 226, a bootable image 228, and an AAP selection engine 230. The regulatory domain information 224 provides information to the UAP about allowed broadcast parameters for a given region. The CLI to preconfigure a DAP for untethered operation may include the SSID of the anchor AP and a preshared key (not shown). When the UAP is configured with the backhaul SSID 226, the regulatory domain information 224 should probably be stored in, e.g., flash, as well (as shown). This prevents the UAP from operating outside of the regulatory limits before it receives its complete configuration from the switch. It must be clearly documented that when prestaging UAPs, the regulatory and antenna information is correct and reflects the actual deployment to avoid regulatory violations. The regulatory domain information may be updated with a running configuration.

The bootable image 228 enables the UAP 204-2 to be deployed with the same services as the AAP 202 (though performance could be adversely impacted by the radio link). When the UAP 204-2 is up and running, the boot configuration associated with the bootable image 228 may be changed. When the boot configuration is changed, the UAP 204-2 must be reset for the changes to take effect. It is not always desirable to allow the boot configuration to change. For example, it is possible for a UAP to find a switch running a software version that does not support untethered APs. When the UAP sees than an older version of software is trying to manage it, the UAP may choose to reboot so as to protect its untethered-capable running image. (This may further require that the anchor AP generate a log message when a radio link is created or destroyed so that link flapping can be identified and, hopefully, remedied.)

The AAP selection engine 230 enables the UAP 204-2 to select an AAP from a plurality of potential AAPs. Any known or convenient algorithm may be implemented to choose an AAP. For example, the AAP may be selected by comparing relative signal strengths and choosing the strongest. Alternatively or in addition, each AAP could broadcast an estimated time to wire, or number of hops to wire, which the AAP selection engine 230 can use to choose an optimal AAP. In a non-limiting embodiment, the implemented algorithm is greedy at the UAP 204-2.

In a non-limiting embodiment, if the UAP 204-2 is unable to associate with the AAP 202, the UAP 204-2 may beacon an SOS signal, including its serial number. The beacon signal is (hopefully) received at an AP, and sent to the wired network for processing (e.g, at a wireless switch). If appropriate, the upstream component may provide the AAP 202 (or some other AP within range of the UAP 204-2) with data and/or instructions to facilitate an association.

Figure 3:
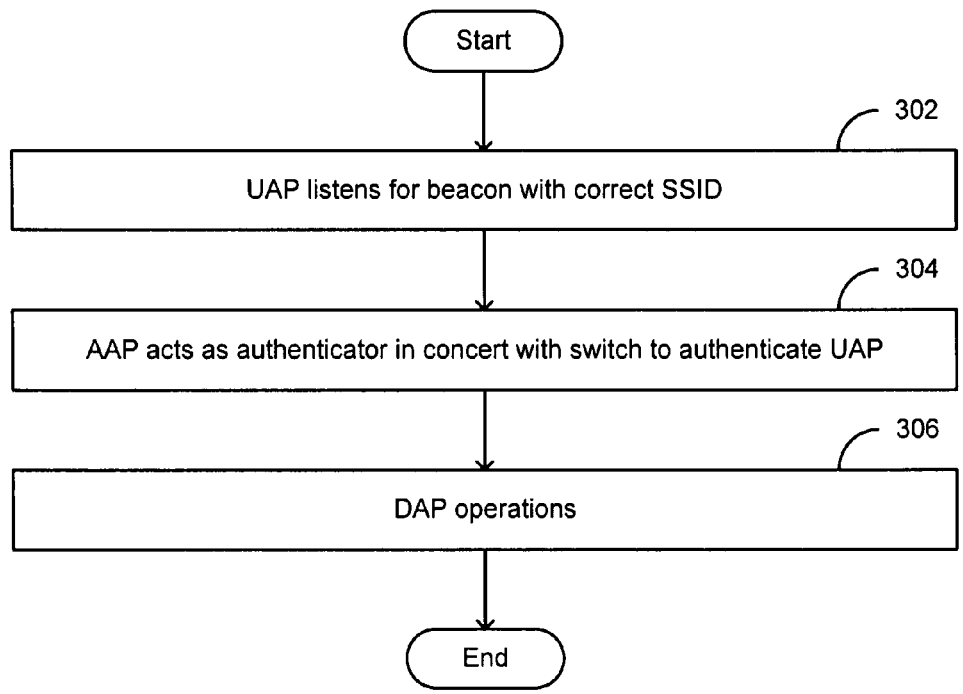
FIG. 3 depicts a flowchart of an example of a method for linking a UAP to an an anchoring access point (AAP).

FIG. 3 depicts a flowchart 300 of an example of a method for linking a UAP to an AAP. In the example of FIG. 3, the flowchart 300 starts at module 302 where a UAP listens for a beacon with a correct SSID. To know whether an SSID is correct, the UAP must either have the SSID stored in memory, or be informed in some other manner. The UAP will associate to the AAP, at which point (or perhaps after authentication) the UAP will have layer 2 connectivity to the AAP. In order for the associated radio link to be established, the AAP acts as an anchor point and the UAP acts as a client device.

In the example of FIG. 3, the flowchart 300 continues to module 304 where the AAP acts as an authenticator in concert with a switch to authenticate the UAP. Implementation of this technique may be based on wpa_supplicant under a BSD license including minimum eap methods. Although wpa_supplicant and WPA-PSK may be used to authenticate, this is an implementation-specific choice; any known or convenient technique that works for the intended purpose may be used.

In the example of FIG. 3, the flowchart 300 continues to module 306 where DAP operations are carried out. This may include DAP+TAPA protocols, including optional switch-AP security. At this point, the flowchart 300 ends, though if the DAP operations end, the flowchart 300 could resume at any point (i.e., module 302, 304, or 306).

Figure 4:
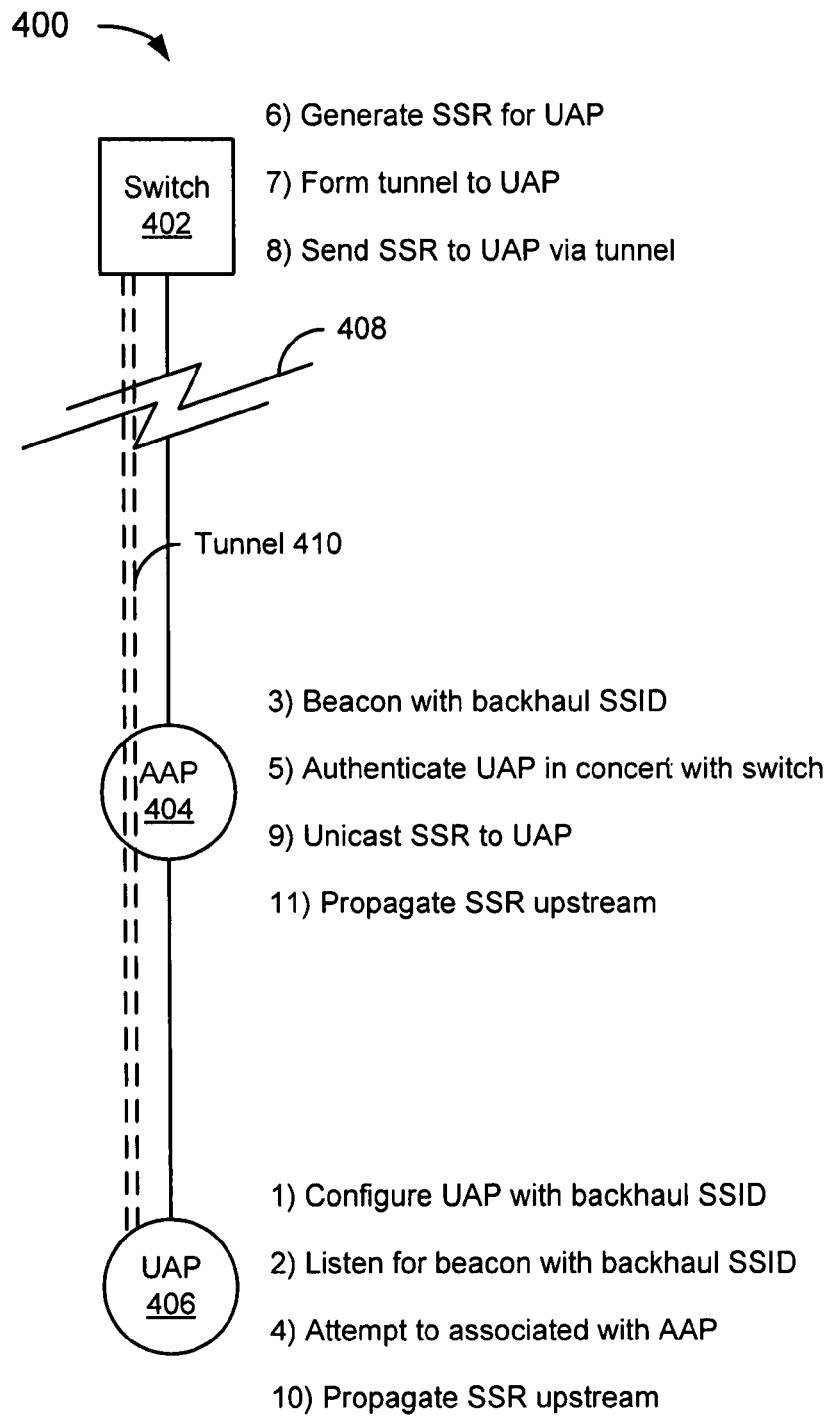
FIG. 4 depicts a diagram illustrating a UAP linking to an existing wireless network.

FIG. 4 depicts a diagram 400 illustrating a UAP linking to an existing wireless network. The diagram 400 includes a switch 402, an AAP 404, and a UAP 406. The switch 402 may be similar to the wireless switch 104 (FIG. 1). The break 408 is intended to represent the case where the AAP 404 is untethered so that there are additional nodes (e.g., a tethered AP) between the AAP 404 and the switch 402. However, in an alternative, the AAP 404 may itself be a tethered AP wire connected to the switch 402. The UAP 406 is initially not linked to the AAP 404, but becomes linked as described below.

The UAP 406 is 1) configured with a backhaul SSID. While this is not a strict requirement, it is a convenience for those who are responsible for installing or placing the UAP within a UAP mesh. Conceivably, the UAP could be configured to receive an SSID over the air or acquire an SSID in some other manner.

The UAP 406 is powered up and 2) listens for a beacon with a backhaul SSID. Again, this is not a strict requirement. It is believed to be more convenient to have the UAP 406 listen for a beacon than to have the UAP initiate a link prior to or instead of receiving a beacon. This is at least in part due to standard practice in 802.11 systems, though such a practice may not be prevalent or even desired in other wireless systems.

The AAP 404 3) broadcasts a beacon with the backhaul SSID. The backhaul SSID may be preconfigured at the AAP 404 or could be received at the AAP 404 from the switch at boot time or after.

The UAP 406 4) attempts to associate with the AAP 404 upon matching the broadcast backhaul SSID with the backhaul SSID stored locally. It may be noted that the backhaul SSID of the UAP 406 is assumed to be the same as that of the broadcast backhaul SSID. However, there may be other UAPs that are within range of the AAP 404 that have different backhaul SSIDs (perhaps associated with a different AAP). Also, a single AAP could conceivably have multiple backhaul radios, each associated with a different backhaul SSID, or even a single backhaul radio associated with multiple backhaul SSIDs.

The AAP 404 5) authenticates the UAP 406 in concert with the switch 402. The UAP 406 may be able to form a layer 2 connection with the AAP 404 when it associates, but the AAP 404 will likely not allow traffic to flow upstream until authentication is complete. While this is not a strict requirement, wireless resources are often relatively scarce, so, in an effort to conserve resources in the case where the UAP 406 is unable to be authenticated, it may be desirable to restrict traffic flow until authentication is complete.

The switch 402 6) generates an SSR for the UAP 406. Since the AAP 404 authenticates the UAP 406 in concert with the switch 402, the switch 402 knows about the UAP 406. So the switch 402 is capable of producing an SSR for the UAP 406. In an embodiment, the SSR includes data associated with authorized stations and access control list (ACL) filters. An ACL refers to rules that typically detail service ports or the like that are available on a host or other layer 3 device, each with a list of hosts and/or networks permitted to use the service. ACLs can be configured to control upstream and downstream traffic. (In this context, they are similar to firewalls.) Typically, servers and routers have network ACLs, but in an illustrative embodiment, ACL rules are provided to APs. The SSR enables the UAP 406 to switch at least some traffic, thereby reducing the amount of traffic that has to be switched higher upstream. Advantageously, this pushes message filtering to the edges (or root) of the UAP mesh.

The switch 402 7) forms a control channel 410 to the UAP 406. It should be noted that the control channel 410 may simply be a virtual "tunnel" in that tables at each hop along the path to the UAP 406 identify the next hop. This is advantageous because it avoids flooding the UAP mesh, which is wasteful of wireless resources. It should be noted that the control channel 410 is not a "tunnel" in the traditional sense because a tunnel is used to carry user data, which is not necessarily the case here.

The switch 402 8) sends the SSR to the UAP 406 via the control channel 410.

The AAP 404 9) unicasts the SSR to the UAP 406. In a non-limiting embodiment, this type of action actually occurs at each hop along the path. The SSR is "unicast" because the AAP 404 knows that the destination of the message is the UAP 406, and any other UAPs (now shown) that are listening to the AAP 404 know the destination is not them or downstream from them.

The UAP 406 10) receives the SSR and propagates the SSR upstream. That is, the SSR is stored at the UAP 406, then sent to the next hop closer to the switch 402. Traffic associated with the UAP 406 can travel upstream as the SSR is propagated.

The AAP 404 11) receives the SSR and propagates the SSR upstream. This occurs at other nodes along the UAP chain up to and including the anchoring (tethered) AP.

Figure 5:
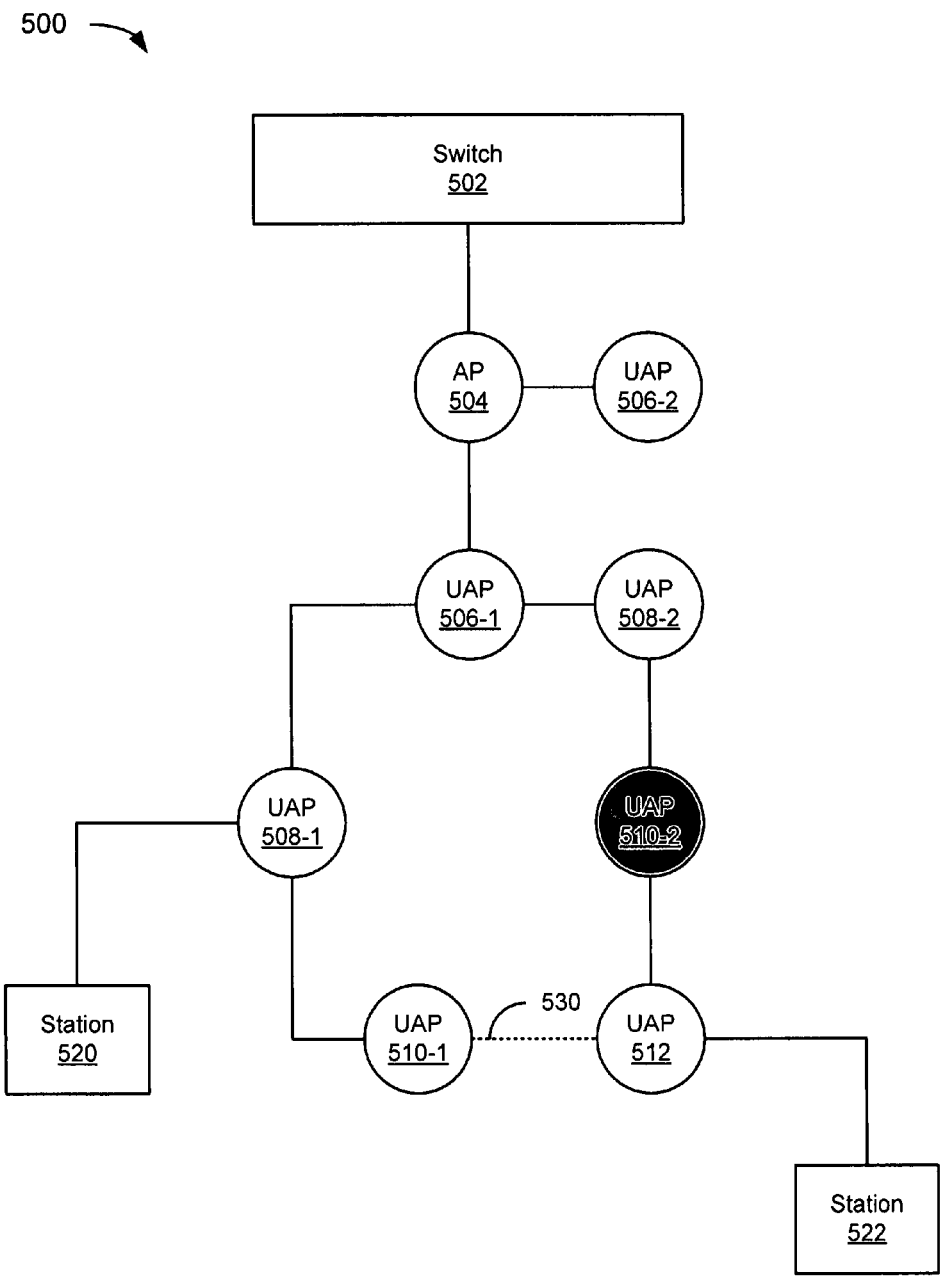
FIG. 5 depicts an example of a system including a self-healing UAP mesh.

FIG. 5 depicts an example of a system 500, including a self-healing UAP mesh. In the example of FIG. 5, the system 500 includes a switch 502, an AP 504, UAPs 506-1 and 506-2 (referred to collectively as "one-hop UAPs 506"), UAPs

508-1 and 508-2 (referred to collectively as "two-hop UAPs 508"), UAPs 510-1 and 510-2 (referred to collectively as "three-hop UAPs 510"), a UAP 512, a station 520, and a station 522.

Initially, it is assumed that each UAP is authenticated and has a valid SSR. The SSRs facilitate at least some switching capability within the UAP mesh. For example, if the station 520 sends a packet to the station 522, the packet travels upstream to the UAP 508-1, then to the UAP 506-1. The UAP 506-1 knows that the destination (station 522) is downstream. Accordingly, rather than sending the packet upstream to the switch 502, the UAP 506-1 makes use of the limited data included in the SSR to send the packet downstream to the UAP 508-2, which sends the packet to the UAP 510-2, which sends the packet to the UAP 512, which sends the packet to the station 522.

The UAP mesh is self-healing in that if a node goes down, only the affected UAPs need to update. Specifically, say the UAP 510-2 goes down. (This is represented in the example of FIG. 5 by the shading of the UAP 510-2.) When the UAP 510-2 goes down, it causes several problems, including 1) the station 522 is no longer associated with a UAP that can forward messages to and from the station 522; 2) the UAP 508-2 and other upstream nodes (e.g., the UAP 506-1) have incorrect data.

Problem 1) can be remedied in the following manner.

1.1) The UAP 512 detects a link failure between itself and the UAP 510-2 because, for the purpose of example, the UAP 510-2 is assumed to have gone down.

1.2) The UAP 512 establishes a link with the UAP 510-1. The new link is represented in the example of FIG. 5 as a dotted line 530. It may be noted that the UAP 512 may have multiple choices of UAPs, though in the example of FIG. 5, only the available UAP 510-1 is depicted. (Presumably, if one of the two-hop UAPs 508 were within range of the UAP 512, the UAP 512 would not have been linked with the UAP 510-2, which is a three-hop UAP. Accordingly, it is assumed that only the UAP 510-1 is in range of the UAP 512.)

1.3) The UAP 510-1 sends a message to the switch 502, alerting the switch 502 that a new SSR is needed because the station 522—and any other stations downstream from UAP 512 (not shown)—is now reachable via a new path.

1.4) The switch 502 sends an SSR downstream to the UAP 510-1. Relevant data from the SSR is propagated at each node, either as the SSR is passed down or by propagation upstream from the UAP 510-1, as has been described previously. Depending upon the implementation and/or embodiment, since the UAP 512 already knows about each station associated with it, and can update upstream routing data locally, the UAP 512 need not necessarily receive the newly sent SSR because the downstream paths remain unbroken, and the upstream path is established through the link to the UAP 510-1.

It may be noted that part of problem 2 is already solved in addressing problem 1. Specifically, the UAP 506-1 has been updated correctly as the SSR is propagated at each node (if applicable). However, the UAP 508-2 still includes incorrect data. Problem 2 can be fully remedied in the following manner:

2.1) The UAP 508-2 detects a link failure between itself and the UAP 510-2.

2.2) The UAP 508-2 waits for a timeout period. Waiting for a timeout period may be important for ensuring that the station 522 maintains connectivity with the switch 502. Specifically, if the UAP 508-2 deletes the data associated with the UAP 510-2 (and therefore data associated with downstream nodes, including the UAP 512 and the station 522), and sends the update upstream, upstream nodes will also delete the data. Eventually the update will reach the switch 502, which will update records to show that stations downstream from the UAP 510-2, including the station 522, are now disassociated. By waiting for a timeout period, the UAP 510-1 can update appropriately, before any disassociation, to ensure continuous connectivity (and, e.g., a smooth handoff).

2.3) The UAP 508-2 deletes the data associated with the UAP 510-2 (necessarily including data associated with the station 522). Since the UAP 508-2 waited for a timeout period, the UAP 510-1 has presumably updated the switch 502, and an SSR and/or other data has been propagated along the path between the switch 502 and the UAP 512. Accordingly, the UAP 506-1-and, more generally, all APs on the path between the UAP 512 and the switch 502-will have current data. Therefore, it is not desirable for the update from the UAP 508-2 (deleting the UAP 510-2 and nodes downstream from UAP 510-2) to be implemented at any of the newly updated nodes because the update will or could (depending upon the implementation) delete good data. In an illustrative embodiment, sequence numbers for updates may be used. Specifically, the sequence number associated with the deletion of the data at the UAP 508-2 should be before the sequence number associated with the update at the UAP 510-1. In this way, when the UAP 506-1 receives an update from the UAP 508-2 to delete data, the UAP 506-1 can check the sequence number of the update and, noticing that the sequence number is before the sequence number associated with the latest update, ignore the update. Advantageously, when a UAP notices that the sequence number comes before a most recent update, the UAP can drop the old update; all upstream nodes will have the correct data so the update need not be passed upstream.

After the UAP 512 is linked back into the UAP mesh via the link 530, the switching functionality of the mesh is also updated. So, if the station 520 sends a packet to the station 522, the packet may be sent up to the UAP 508-1, which recognizes that the station 522 is downstream. Then the UAP 508-1 sends the packet downstream to UAP 510-1, which sends the packet to the UAP 512, which sends the packet to the station 522.

As used herein, an AP may refer to a standard (tethered) AP or to a UAP. Where a distinction should be drawn, an AP may be referred to as a "(tethered) AP" or a "UAP," as appropriate.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. An apparatus, comprising:
   a first untethered access point (UAP) configured to be included within a UAP mesh, the first UAP configured to be operatively coupled to an access point (AP) operatively coupled to a wireless switch;
   the first UAP including a switching engine embodied in a computer-readable medium, the switching engine configured to send a first station switching record received at a first time from the wireless switch to a second UAP from the UAP mesh, the second UAP enabled to switch traffic locally based on the station switching record, the switching engine configured to receive a second station switching record when a new path is available.

2. The system of claim 1, further comprising wherein the UAP is configured to be coupled to the AP operatively coupled to the wireless switch included in a wireless network coupled to a wired backbone.

3. The system of claim 1, wherein the UAP mesh is self-healing.

4. The system of claim 1, wherein a spanning tree algorithm is embodied in a computer readable medium of the UAP mesh.

5. The system of claim 1, wherein the wireless switch includes an authorization engine, embodied in a computer-readable medium, the authorization engine configured to authorize a downstream station.

6. The system of claim 1, wherein the switching engine is configured to send a data unit based on the first station switching record.

7. The system of claim 1, wherein, the first station switching record is received from the wireless switch at the first UAP.

8. An apparatus, comprising:
an untethered access point (UAP) configured to be included in a UAP mesh, the UAP configured to be operatively coupled to an access point that is operatively coupled to a switch;
the UAP configured to receive at a first time from a switch a first station switching record defined by the switch via a control channel, the UAP enabled to switch traffic locally based on the station switching record;
the UAP configured to forward the first station switching record and a data unit to the access point; and
the UAP configured to receive a second station switching record when a new path is available.

9. The apparatus of claim 8, wherein the first station switching record includes an access control list.

10. The apparatus of claim 8, wherein the UAP is configured to receive the first station switching record from a unicast signal defined by the access point.

11. The apparatus of claim 8, wherein the UAP is configured to be authenticated by both the switch and the access point prior to receiving the first station switching record.

12. The apparatus of claim 8, wherein the UAP further includes a selection engine configured to select the access point from a plurality of access points.

13. An apparatus, comprising:
an access point operatively coupled to an untethered access point and a switch;
the access point configured to receive from the switch a first station switching record defined by the switch via a control channel, the untethered access point enabled to switch traffic locally based on the first station switching record, the control channel being a virtual tunnel between the switch and the untethered access point, the virtual tunnel include a first hop, a second, hop, and a table associated with the first hop to identify the second hop;
the access point configured to send a signal, including the first station switching record, to the untethered access point;
the access point configured to receive the first station switching record and a data unit from the untethered access point; and
the access point configured to receive a second station switching record when a new path is available.

14. The apparatus of claim 13, wherein the first station switching record includes at least one of an access control list or data associated with authorized stations.

15. The apparatus of claim 13, wherein the signal is a unicast signal configured to be received only by the untethered access point.

16. The apparatus of claim 13, wherein the access point further includes an authentication engine configured to authenticate the untethered access point prior to sending the signal.

17. The apparatus of claim 13, wherein the access point is further configured to forward the station switching record with the data unit received from the untethered access point.

* * * * *